United States Patent
Sellers et al.

(10) Patent No.: US 10,626,849 B2
(45) Date of Patent: Apr. 21, 2020

(54) METHODS, SYSTEMS, AND DEVICES FOR TETHER CORE DIAGNOSTICS AND MONITORING

(71) Applicant: Makani Technologies LLC, Alameda, CA (US)

(72) Inventors: Robert S. Sellers, Mountain View, CA (US); Elias Wolfgang Patten, Mountain View, CA (US)

(73) Assignee: Makani Technologies LLC, Alameda, CA (US)

( * ) Notice: Subject to any disclaimer, the term of this patent is extended or adjusted under 35 U.S.C. 154(b) by 274 days.

(21) Appl. No.: 15/724,625

(22) Filed: Oct. 4, 2017

(65) Prior Publication Data

US 2018/0094619 A1    Apr. 5, 2018

Related U.S. Application Data

(60) Provisional application No. 62/404,353, filed on Oct. 5, 2016, provisional application No. 62/434,855, filed on Dec. 15, 2016.

(51) Int. Cl.
*F03D 9/34* (2016.01)
*B64C 39/02* (2006.01)
(Continued)

(52) U.S. Cl.
CPC .............. *F03D 9/34* (2016.05); *B64C 31/06* (2013.01); *B64C 39/022* (2013.01); *D07B 1/145* (2013.01);
(Continued)

(58) Field of Classification Search
CPC ... F03D 5/00; F03D 9/34; F03D 17/00; F03D 9/255; B64C 39/022; B64C 31/06;
(Continued)

(56) References Cited

U.S. PATENT DOCUMENTS

2015/0041598 A1    2/2015   Nugent et al.
2016/0083115 A1    3/2016   Hess
(Continued)

FOREIGN PATENT DOCUMENTS

EP    0894353    2/1999

OTHER PUBLICATIONS

Written Opinion of the International Searching Authority, International Application No. PCT/US2017/055064, dated Jan. 17, 2018.
(Continued)

*Primary Examiner* — Mussa A Shaawat
(74) *Attorney, Agent, or Firm* — McDonnell Boehnen Hulbert & Berghoff LLP

(57) ABSTRACT

An example system includes a ground station, an aerial vehicle, a tether, a probe, and a control system. The tether includes a core having a strength member as well as an electrical conductor that is wound around the core. The probe is attached to the strength member so that the probe is able to measure an electrical property of at least a portion of the strength member. The control system is configured to measure the electrical property along the strength member at a predetermined measurement rate and also determine that the electrical property is outside a predetermined range. Based on the electrical property, damage to the tether core can be assessed.

20 Claims, 15 Drawing Sheets

(51) Int. Cl.
| | |
|---|---|
| *F03D 17/00* | (2016.01) |
| *F03D 9/25* | (2016.01) |
| *H02K 7/18* | (2006.01) |
| *F03D 5/00* | (2006.01) |
| *D07B 1/14* | (2006.01) |
| *B64C 31/06* | (2020.01) |

(52) U.S. Cl.
CPC ............... *F03D 5/00* (2013.01); *F03D 9/255* (2017.02); *F03D 17/00* (2016.05); *H02K 7/183* (2013.01); *F05B 2240/917* (2013.01); *F05B 2240/921* (2013.01); *Y02E 10/70* (2013.01); *Y02E 10/725* (2013.01); *Y02E 10/728* (2013.01)

(58) Field of Classification Search
CPC ........ H02K 7/183; D07B 1/145; Y02E 10/70; Y02E 10/725; Y02E 10/728
See application file for complete search history.

(56) References Cited

U.S. PATENT DOCUMENTS

| | | |
|---|---|---|
| 2016/0208779 A1 | 7/2016 | Calverley |
| 2016/0258851 A1 | 9/2016 | Patten et al. |

OTHER PUBLICATIONS

International Search Report, International Application No. PCT/US2017/055064, dated Jan. 17, 2018.

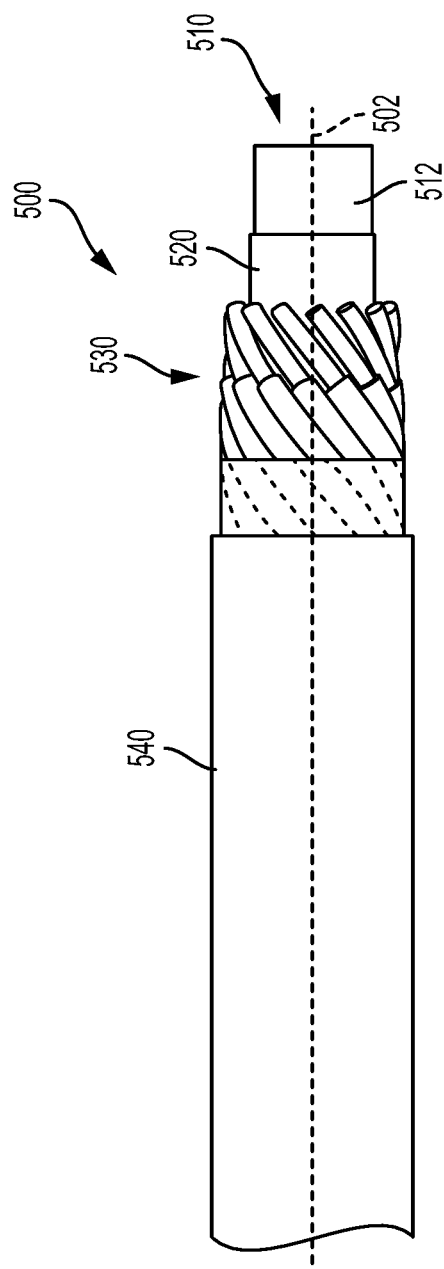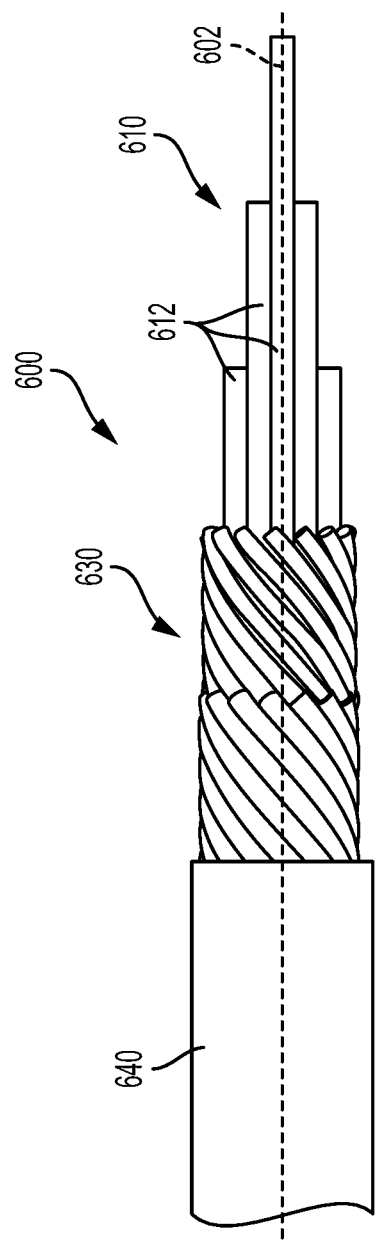

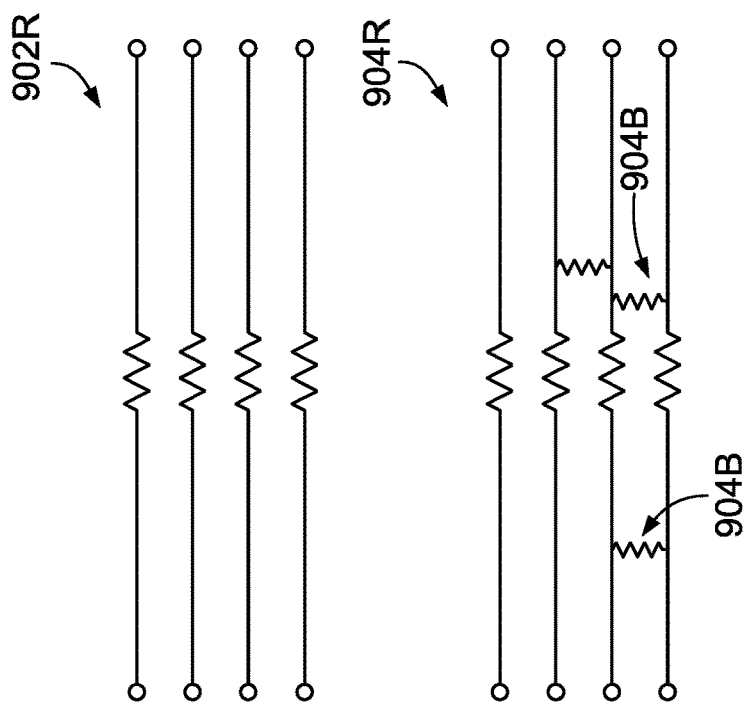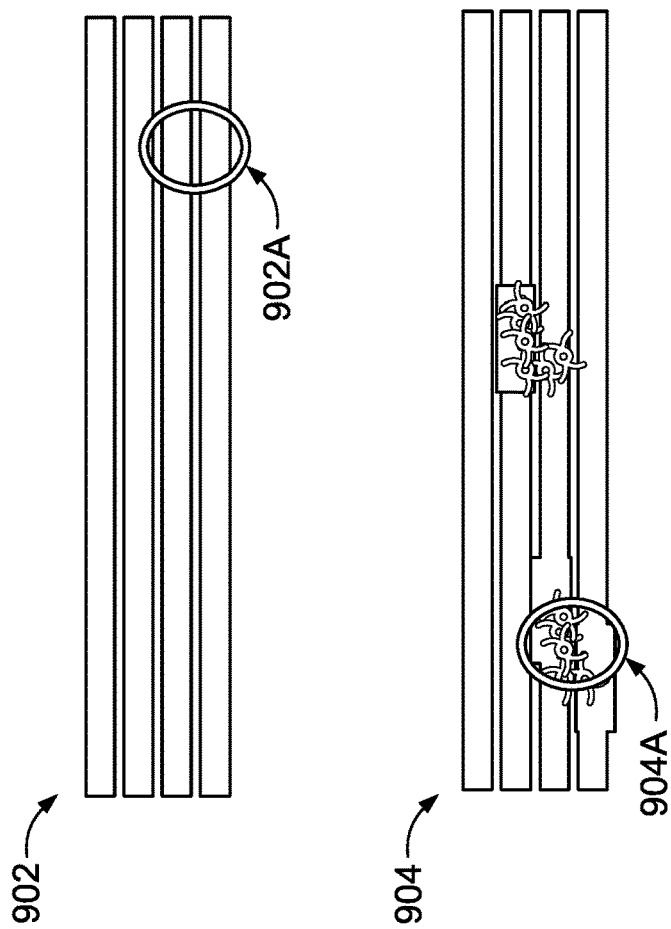
FIG. 9

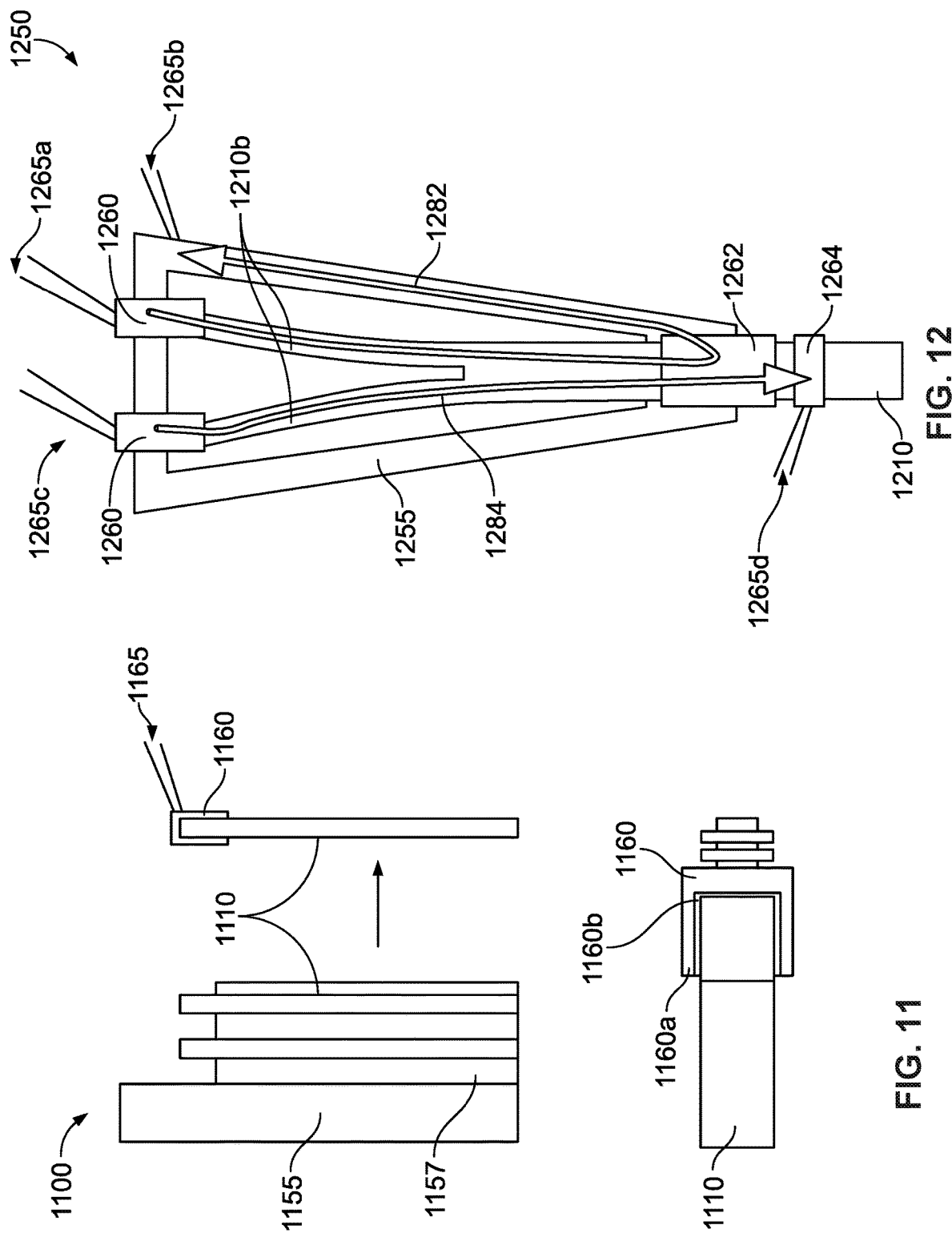

METHODS, SYSTEMS, AND DEVICES FOR TETHER CORE DIAGNOSTICS AND MONITORING

CROSS-REFERENCE TO RELATED APPLICATION

This application claims the benefit of U.S. Provisional Application No. 62/404,353, filed Oct. 5, 2016 and U.S. Provisional Application No. 62/434,855, filed Dec. 15, 2016, each of which are explicitly incorporated by reference herein in its entirety.

BACKGROUND

Unless otherwise indicated herein, the materials described in this section are not prior art to the claims in this application and are not admitted to be prior art by inclusion in this section.

Power generation systems may convert chemical and/or mechanical energy (e.g., kinetic energy) to electrical energy for various applications, such as utility systems. As one example, a wind energy system may convert kinetic wind energy to electrical energy.

The use of wind turbines as a means for harnessing energy has been used for a number of years. Conventional wind turbines typically include large turbine blades positioned atop a tower. The cost of manufacturing, erecting, maintaining, and servicing such wind turbine towers, and wind turbines is significant.

An alternative to the costly wind turbine towers that may be used to harness wind energy is to use an aerial vehicle attached to a ground station with an electrically conductive tether. Such an alternative may be referred to as an Airborne Wind Turbine or AWT. The electrically conductive tether used in an AWT may undergo repeated loading, often at very high load values and over a large number of cycles. Thus, a system or method to monitor and diagnose the health or integrity of the tether, including if any damage has occurred to the tether, is useful.

SUMMARY

Various systems, methods, and devices for the monitoring and diagnosing the integrity or mechanical strength of a tether are disclosed herein. More specifically, determining an electrical property across a strength member of a tether core may be used in order to make a determination about the mechanical or structural health of the tether. Example systems, methods, and devices are capable of measuring an electrical property across various configurations of one or more strength members that make-up a tether core. A change within the value of the electrical property beyond various predetermined ranges provides insight into internal stress, strain, and potential damage to the tether strength member. Moreover, electrical properties across the strength member may be measured at various intervals as part of regular operation and/or maintenance operations in order to increase reliability of example AWT systems.

In a first aspect, a system is provided. The system includes a ground station, an aerial vehicle, a tether, a probe, and a control system. The tether is connected to the ground station at a first end and also connected to the aerial vehicle at a second end of the tether. The tether includes a core having a strength member as well as an electrical conductor that is wound around the core. The probe is attached to the strength member so that the probe is able to measure an electrical property of at least a portion of the strength member. The control system is configured to measure the electrical property along the strength member at a predetermined measurement rate and also determine that the electrical property is outside a predetermined range.

In a second aspect, a method is provided. The method includes coupling a probe to a strength member of a tether. The probe is configured to measure an electrical property along at least a portion of the strength member. The method further includes measuring the electrical property of the portion of the strength member as a predetermined measurement rate. Additionally, the method includes determining that the electrical property is outside a predetermined range.

In yet another aspect, another system is provided. The system includes a tether and a probe. The tether has a plurality of strength members, a first termination, and a second termination. The strength members are splayed out within the terminations. The probe is configured to measure an electrical property of at least one of the strength members by coupling in at least two locations. Those locations include (i) a splayed end of a strength member splayed within the first termination (ii) a splayed end of the strength member splayed within the second termination (iii) a splayed end of another strength member splayed within the first termination, (iv) a surface contact coupled at a position along the tether, wherein the surface contact is in electrical connection with at least one of the plurality of strength members, and (v) a grounding connection.

In further aspects, any type of device or system could be used or configured as a means for performing functions of any of the methods described herein (or any portions of the methods described herein). For example, another system includes means to couple a probe to a strength member of a tether. The probe is configured to measure an electrical property of a portion of the strength member. The system further includes means for measuring the electrical property of the portion of the strength member. Additionally, the system includes means for determining that the electrical property is outside a predetermined range. In further embodiments, the system includes means for determining a tension in the tether, determining a temperature of the tether, as well as determining that the strength member is damaged.

These as well as other aspects, advantages, and alternatives will become apparent to those of ordinary skill in the art by reading the following detailed description, with reference where appropriate to the accompanying drawings.

BRIEF DESCRIPTION OF THE DRAWINGS

FIG. 5 depicts a tether with a single core, according to an example embodiment.

FIG. 6 depicts a tether with multiple cores, according to an example embodiment

FIG. 9 depicts a tether and corresponding equivalent resistance, according to an example embodiment.

FIG. 11 depicts tether strength members with mechanical probe connections, according to an example embodiment.

FIG. 12 depicts a tether termination with electrical conduction paths, according to an example embodiment.

DETAILED DESCRIPTION

Figure 1:
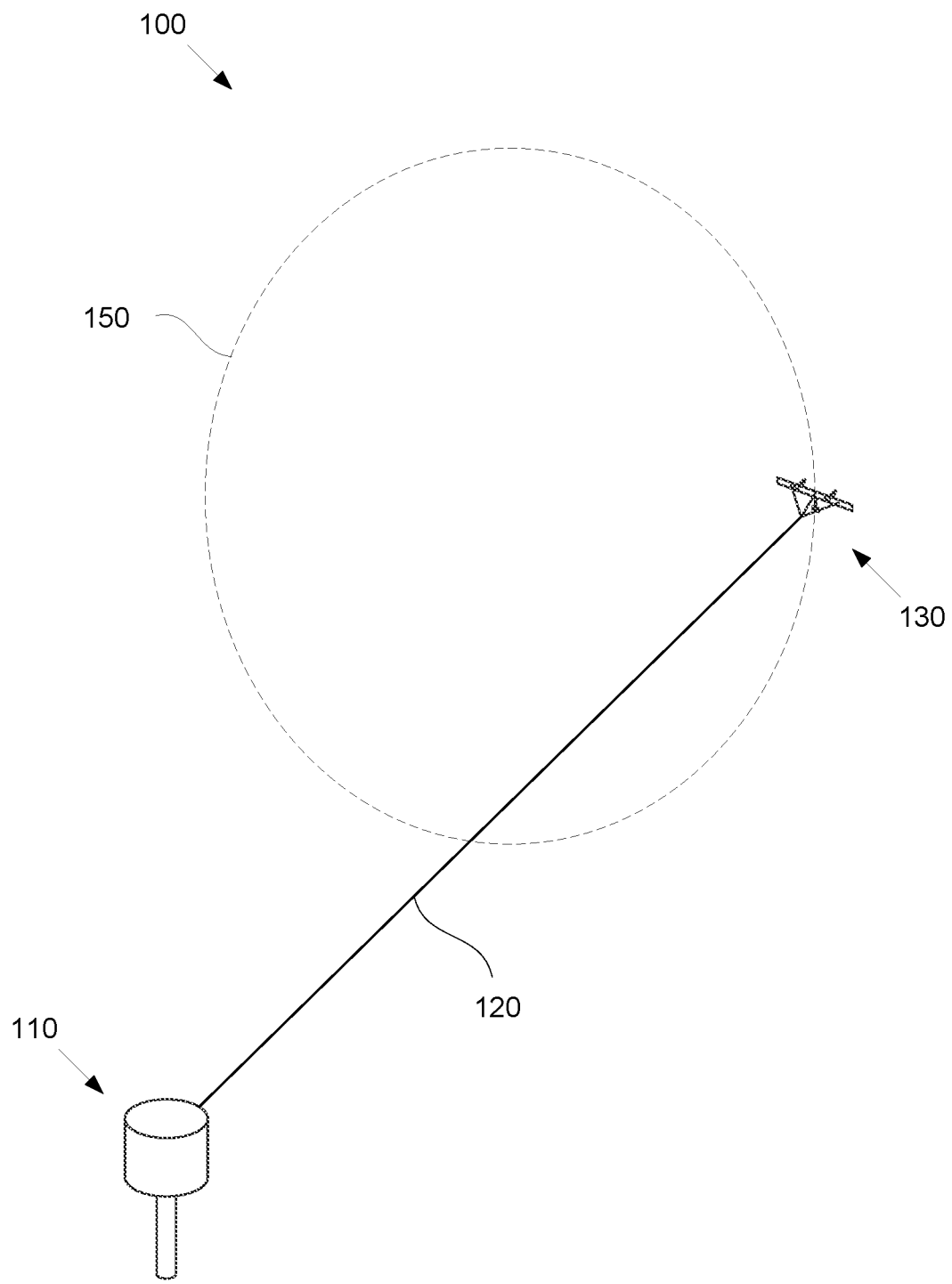
FIG. 1 depicts an Airborne Wind Turbine (AWT), according to an example embodiment.

Example methods, systems, and devices are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

I. Overview

Illustrative embodiments relate to aerial vehicles, which may be used in a wind energy system, such as an Airborne Wind Turbine (AWT). In particular, illustrative embodiments may relate to or take the form of devices, systems, and methods relating to diagnosis and/or monitoring for damage within a tether or tether termination. Within some aspects, illustrative embodiments may relate to regular monitoring of a mechanical integrity of a tether or a tether termination. The mechanical integrity of a tether may include tether core diagnostics, such as a mechanical property of the tether (e.g. a tensile strength, among others), estimating a time to partial or complete component failure, or determining performance metrics (e.g. power efficiency, etc.), among other possible tether core diagnostics. Additionally, based on characteristics of damage realized within a tether or tether termination, example illustrative embodiments include diagnosis a cause and type of damage.

By way of background, an AWT may include an aerial vehicle that flies in a closed path, such as a substantially circular path, to convert kinetic wind energy to electrical energy. In an illustrative implementation, the aerial vehicle may be connected to a ground station via a tether. While tethered, the aerial vehicle can: (i) fly at a range of elevations and substantially along the path, and return to the ground, and (ii) transmit electrical energy to the ground station via the tether. In some implementations, the ground station may transmit electricity to the aerial vehicle for take-off and/or landing.

Tethers described herein may be configured to withstand one or more forces when the aerial vehicle is in flight (e.g., tension from aerodynamic forces acting on the aerial vehicle), and configured to transmit electricity between the aerial vehicle and the ground station. Tethers described herein may also experience stress while in storage, such as in spooled storage. Determining that the tether is damaged, prior to putting the aerial vehicle into flight, or if the tether become damaged during flight, or is more likely to become damaged, is beneficial to safe and efficient operation of the AWT system.

Within examples, the tethers described herein may include a core that is designed to provide strength and durability to the tether. The core may be a single core design (e.g., made up of a single component) or a multiple core design (e.g., where multiple elements or components come together to form the core) and may be constructed from a variety of materials. The tether core may be constructed from a pultruded fiber rod, carbon fiber rod, other type of composite rod, one or more metals (e.g., aluminum), and/or a combination of carbon fiber and/or one or more metals. Furthermore, the tether core may have electrical properties that may be measured.

In some instances, the tether core may be constructed from one or more strength members. One or more probes may be coupled to the one or more strength members of the core. Strength members may be splayed out within a tether termination at either or both ends of an example tether. In such examples, the probe(s) may be integrated or otherwise considered in the design of the tether termination. The probe(s) may be configured to be coupled to a multimeter, a voltmeter, another gauge, and/or a computing device. In one example, the probe may include a time-domain reflectometer (TDR) configured to propagate a signal through the strength member(s) of the tether core. As such, one or more electrical properties of the strength member(s) may be measured using the one or more probes.

The mechanical integrity of a tether core may become compromised if a strength member of the tether core becomes damaged. A strength member of the tether core may become damaged at any location along the length of the tether, including within a termination of the tether. If the strength member is damaged as a result of tensile strain, tensile fatigue, compression strain, bending fatigue, creep compression failure, delamination, heating, torsional stress, or other form of stress, the damage may be manifested by an increase or decrease in electrical resistance of the strength member, for example. Relationships between various failure modes and change in resistance may be determined in order to determine if damage has occurred, how much damage has occurred, and/or in some instances, the type of damage that has occurred. For example, bending fatigue that may lead to eventual catastrophic failure of strength members within the core may occur when the circuit resistance increases approximately 5%-20%. In other examples, creep compression failure may occur when the circuit resistance increases 20-50%.

Comparing the measured electrical resistance to known experimental resistance values may allow an operator to determine how much the tether core has been damaged and/or an amount of remaining service life, if any. In other aspects, monitoring and/or analyzing the determined electrical resistance over a period of time may indicate whether there is damage to the tether core, whether that damage is increasing, and/or how long until the tether should be taken out of service. Thus, the measured electrical resistance may indicate a mechanical integrity of the tether core. The measured electrical resistance may further indicate if a strength member (or more than one strength member) has become damaged. For example, the measured electrical resistance may help define product lifetime ratings, knockdowns for increased temperature service, and stress vs. number of cycles to failure curves (S-N curves). Within at least some examples, the electrical resistance may be determined, at least in part, by utilizing a 4-wire electrical resistance method.

Tethers, as described herein, may be susceptible to various forms of damage, and measuring the electrical properties of one or more strength members of the tether core may allow for the specific forms of damage to be monitored. For example, where the tether core includes multiple strength members, individual strength members or strands may fray within the tether core from friction or fretting damage during use. As such, individual strength members that may be electrically isolated from one another may no longer be isolated. As such, a change in electrical resistance may be correlated to an amount of fretting damage between the strands within the core.

However, a change in tension in the tether and/or temperature of the tether may also cause a change to an electrical property of the strength member of the tether. As such, the tension and/or the temperature may also be necessary considerations in determining if a change in the electrical property is a result of, or attributable to, damage to the tether. For example, if the tension increases slightly due to a wind or a change in a load on the tether, the electrical resistance may also increase. However, the increase of electrical resistance may not be indicative of damage to the tether in that instance. As such, a system may also consider the tension, determine that a change in the tension is within a threshold range of tension, and therefore the change in electrical resistance is not likely attributable to the tether becoming damaged. The threshold range of tension may account for slight changes in loading caused by a change in a wind speed or a change in tension based on the aerial vehicle's flight path. A change in temperature may similarly cause a change in electrical resistance and thus also be considered. Therefore, determining a mechanical integrity of the tether or if a strength member of a tether is damaged may be based on a determination of the tension in the tether, the temperature of the tether, as well as a measured electrical property of the strength member of the tether.

Illustrative embodiments include monitoring and/or diagnosing damage to a tether, or more particularly a strength member of the tether, at a variety of locations, times, and conditions. For example, an example system may check for damage to a tether while the tether is spooled before being put into use or while the tether is in use. Moreover, an example system may be configured to monitor for damage at specific locations along a tether, such as within the termination, near a termination, or across any portion of the tether core between probes.

Determining if a strength member of the tether is damaged may be performed during operation of the aerial vehicle in flight, in one example. A damaged tether core may have altered mechanical properties, such as reduced tensile strength of the tether. If a tensile load beyond the tensile strength of the tether is applied to the tether, the tether might experience partial or complete failure. As such, in some examples, determining a mechanical integrity, including any mechanical properties of a tether, or checking for damage within the tether may be part of normal operation, regular maintenance, or inspection schedule. For example, a gauge, meter, or computing device may be coupled to at least one tether strength member of a tether core via a probe once a week, once a month, bi-monthly, or on some other schedule. In other examples, an electrical property may be measured continuously.

Within some examples, changes in electrical resistance (or another electrical property) may indicate different parameters in real-time and may also be correlated with other sensors or known parameters. For example, changes in resistance that occur at approximately 0.1 Hz frequencies and correlated with changes in wind speed may indicate a change in a load on a tether coupled to an aerial vehicle. In another example, changes in electrical resistance that occur at a time scale relative to a thermal constant of the tether may indicate a change in temperature of the tether. Additionally, changes of electrical resistance that occur more gradually over longer periods of time, such as months or years, may indicate damage caused by fatigue. Finally, changes of electrical resistance that occur over short period of time or possibly even suddenly may indicate damage caused by creep compression failure within the tether.

In another example, where the tether core is splayed within a termination, the tether core within the tether termination may experience high stress from loads imposed by the AWT system and thus the tether core may be susceptible to specific types of damage within the tether termination. For example, a splayed tether core may experience buckling or breaking from shearing along the length of the tether termination. In other examples, the tether core may experience fatigue "pull out" failure in which the tether core or part of the tether core and the tether termination break apart from each other. Furthermore, within some examples, damage may accumulate within the termination over repeated fatigue cycles and thus the tether may have a lower ultimate residual break strength. As such, measuring the electrical properties within the tether termination of the one or more splayed strength members may allow for monitoring of any damage to the tether core inside the termination.

A control system may periodically, at a predetermined measurement rate, determine an electrical property along one or more of the strength members of the tether. If the electrical property changes beyond a predetermined allowable threshold, and a tension and a temperature of the tether are determined, the control system may cause a change in flight or operational parameters of the aerial vehicle including causing the aerial vehicle to land. In some instances, the electrical property may be determined by a measurement system every time before the aerial vehicle is launched or every time after the aerial vehicle lands, among other periods.

In other examples, a tether may buckle from compression forces during fabrication supply chain and/or storage of the tether. As such, measuring the electrical properties of the tether core before putting the tether into use or operation, such as after manufacturing and/or shipping the tether, may prevent the use of a damaged tether in an AWT. In further examples, electrical resistance may be determined during manufacturing of the tether. In such an example, the electrical resistance may be used to determine quality of the construction of the tether. Thus, determining an electrical resistance of a tether may be part of a quality assurance/quality control process during the manufacture of the tether.

For example, if a tether has been wrapped around a spool in storage, measuring an electrical resistance across at least a portion of the tether may be used to determine manifestation of compression creep and/or relaxation buckle failures. In yet other examples, measuring the time-domain signal reflection characteristics via a TDR may provide insight into the location of a buckle failure, for example. Knowing the location of buckle failure may save time inspecting the entire length and may prevent use of a damaged tether in the field. Additionally, knowing the location of a buckle failure during supply chain may aid in deciding whether to scrap an entire production run, or to scrap only a portion of the run should a continuous length exist within a spool that is long enough to make a good tether.

Among other aspects, determining an electrical resistance of at least a portion of the tether core may also provide information about the stress and/or forces on the tether. For example, electrical resistance may be used to determine tension in a tether. A probe coupled to a core element of a tether may act as a redundant load cell, or an array of probes along the entire length of the tether core could quantify tensile changes along the length, such as in a tether whipping or galloping situation. In such an example, the probe may be considered a sensor or part of a sensing system coupled to a computer system.

Beneficially, embodiments described herein may provide information on a mechanical integrity of a tether that includes information on if a strength member of the tether is damaged or has a higher likelihood of becoming damaged. Determining the mechanical integrity may provide insight into allowable loading profiles, expected lifespan, and other diagnostic information about the tether and/or an AWT system. Determining the mechanical integrity of tether, determining a mechanical property of tether, or determining if a tether strength member is damaged may be accomplished by determining a tension experienced by the tether, a temperature of the tether, and measuring at least one electrical property of the tether, such as voltage, current, and/or resistance and correlating those values with known and/or predetermined acceptable values. Within examples, determining that the tether is damaged and/or how much the tether is damaged may allow operators to change control schemes and/or limit any other damage to the tether or other components of an AWT connected to the tether. Within further examples, determining that the tether is damaged and/or how much the tether is damaged may allow operators to schedule maintenance, repair, replacement, or other testing/inspection of the tether.

II. Illustrative Systems

A. Airborne Wind Turbine (AWT)

FIG. 1 depicts an AWT 100, according to an example embodiment. In particular, the AWT 100 includes a ground station 110, a tether 120, and an aerial vehicle 130. As shown in FIG. 1, the tether 120 may be connected to the aerial vehicle on a first end and may be connected to the ground station 110 on a second end. In this example, the tether 120 may be attached to the ground station 110 at one location on the ground station 110, and attached to the aerial vehicle 130 at three locations on the aerial vehicle 130. However, in other examples, the tether 120 may be attached at multiple locations to any part of the ground station 110 and/or the aerial vehicle 130.

The ground station 110 may be used to hold and/or support the aerial vehicle 130 until it is in an operational mode. The ground station 110 may also be configured to allow for the repositioning of the aerial vehicle 130 such that deploying of the device is possible. Further, the ground station 110 may be further configured to receive the aerial vehicle 130 during a landing. The ground station 110 may be formed of any material that can suitably keep the aerial vehicle 130 attached and/or anchored to the ground while in hover flight, crosswind flight, and other flight modes, such as forward flight (which may be referred to as airplane-like flight). In some implementations, a ground station 110 may be configured for use on land. However, a ground station 110 may also be implemented on a body of water, such as a lake, river, sea, or ocean. For example, a ground station could include or be arranged on a floating off-shore platform or a boat, among other possibilities. Further, a ground station 110 may be configured to remain stationary or to move relative to the ground or the surface of a body of water.

In addition, the ground station 110 may include one or more components (not shown), such as a winch, that may vary a length of the tether 120. For example, when the aerial vehicle 130 is deployed, the one or more components may be configured to pay out and/or reel out the tether 120. In some implementations, the one or more components may be configured to pay out and/or reel out the tether 120 to a predetermined length. As examples, the predetermined length could be equal to or less than a maximum length of the tether 120. Further, when the aerial vehicle 130 lands in the ground station 110, the one or more components may be configured to reel in the tether 120.

The tether 120 may transmit electrical energy generated by the aerial vehicle 130 to the ground station 110. In addition, the tether 120 may transmit electricity to the aerial vehicle 130 in order to power the aerial vehicle 130 for takeoff, landing, hover flight, and/or forward flight. The tether 120 may be constructed in any form and using any material which may allow for the transmission, delivery, and/or harnessing of electrical energy generated by the aerial vehicle 130 and/or transmission of electricity to the aerial vehicle 130. In some examples, the tether 120 may have a fixed length and/or a variable length. For instance, in at least one such example, the tether 120 may have a length of 140 meters.

The tether 120 may also be configured to withstand one or more forces of the aerial vehicle 130 when the aerial vehicle 130 is in an operational mode. For example, the tether 120 may include a core that includes a strength member. The strength member of the core may be configured to withstand one or more forces of the aerial vehicle 130 when the aerial vehicle 130 is in hover flight, forward flight, and/or crosswind flight. Among other aspects, the strength member may be electrically conductive. As such, a probe may be coupled to the strength member and the probe may be configured to measure an electrical property of the electrically conductive strength member. In some instances, the probe may be detachably coupled or otherwise electrically coupled to the strength member. Furthermore, within examples, more than one probe may be used to measure the electrical property of the strength member. The electrical property of the strength member may include a current, a voltage, and/or a resistance. Within examples, a measurement system may be coupled to the probe in order to measure the electrical property.

In some examples, the probe may include a time-domain reflectometer (TDR) that is configured to propagate a signal through the strength member of the tether 120. If a mechanical integrity of the strength member is compromised or deteriorated, for example if the strength member of the tether core is damaged, the damage may be manifested by characteristics (such as magnitude, duration, and/or shape) of a corresponding reflection of the signal propagated by the TDR. Other sensors and probes may also be installed so that a status of the tether 120 may be monitored. The status of the tether 120 may include a tension in the tether 120 caused by one or more forces, a temperature of the tether 120, and/or an electrical property of the strength member of the tether 120.

The measured electrical property may be correlated to damage or potential damage within the tether 120, specifically within the strength member. For example, an electrical resistance may be measured along at least a portion of the strength member of the core the tether 120. As such, when the aerial vehicle 130 is in flight, the electrical resistance may be measured at a predetermined measurement rate, i.e. at a regular interval. In some other examples, the electrical resistance may be measured as an aspect of a pre-flight and/or post-flight checklist before launching or landing the aerial vehicle 130. If the electrical resistance changes from one measurement to the next the strength member of the tether 120 may have become damaged or the mechanical integrity may be impacted in some other way. However, the electrical resistance may have also changed from one measurement to the next based on other parameter such as the tension in the tether 120 and/or a temperature of the tether 120, among others.

In some embodiments, AWT 100 may include a control system or other computing device configured to determine parameters or other aspects of AWT 100. For example, while the aerial vehicle 130 is in flight, the control system may be configured to determine a tension in the tether 120, a temperature of the tether, and to measure the electrical property along at least a portion of the strength member of the tether 120. Based on the tension, the temperature, and the measured electrical property, the control system may also be configured to determine if a strength member of the tether is damaged or is more likely to become damaged. In some examples, a tether that is damaged may result in a lower tensile strength, fatigue life, or other mechanical property that may impact a control scheme or other operational parameter of the aerial vehicle 130. Similarly, if a tether is determined to be more susceptible to damage based on a measured electrical property, that may also impact a control scheme or other operational parameter. As such, determining if damage has occurred or may be more likely to occur to a strength member of a tether core may include determining a change to a mechanical property of the tether core.

The aerial vehicle 130 may be configured to fly substantially along a closed path 150 to generate electrical energy. The term "substantially along," as used in this disclosure, refers to exactly along and/or one or more deviations from exactly along that do not significantly impact generation of electrical energy.

The aerial vehicle 130 may include or take the form of various types of devices, such as a kite, a helicopter, a wing and/or an airplane, among other possibilities. The aerial vehicle 130 may be formed of solid structures of metal, plastic and/or other polymers. The aerial vehicle 130 may be formed of any material which allows for a high thrust-to-weight ratio and generation of electrical energy which may be used in utility applications. Additionally, the materials may be chosen to allow for a lightning hardened, redundant and/or fault tolerant design which may be capable of handling large and/or sudden shifts in wind speed and wind direction.

The closed path 150 may be various different shapes in various different embodiments. For example, the closed path 150 may be substantially circular. And in at least one such example, the closed path 150 may have a radius of up to 265 meters. The term "substantially circular," as used in this disclosure, refers to exactly circular and/or one or more deviations from exactly circular that do not significantly impact generation of electrical energy as described herein. Other shapes for the closed path 150 may be an oval, such as an ellipse, the shape of a jelly bean, the shape of the number of 8, etc.

The aerial vehicle 130 may be operated to travel along one or more revolutions of the closed path 150.

B. Illustrative Components of an AWT

Figure 2:
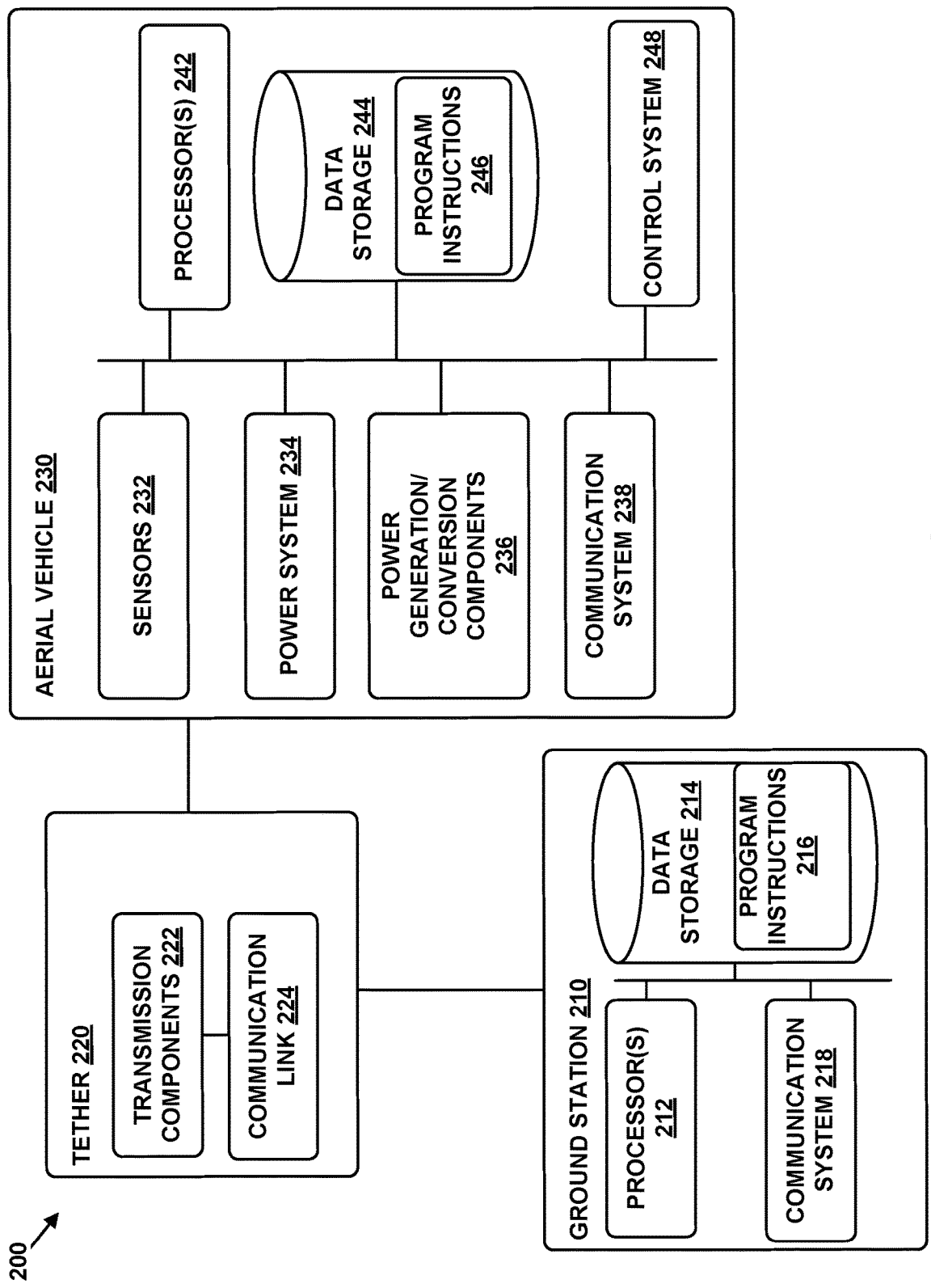
FIG. 2 is a simplified block diagram illustrating components of an AWT, according to an example embodiment.

FIG. 2 is a simplified block diagram illustrating components of the AWT 200. The AWT 100 may take the form of or be similar in form to the AWT 200. In particular, the AWT 200 includes a ground station 210, a tether 220, and an aerial vehicle 230. The ground station 110 may take the form of or be similar in form to the ground station 210, the tether 120 may take the form of or be similar in form to the tether 220, and the aerial vehicle 130 may take the form of or be similar in form to the aerial vehicle 230.

As shown in FIG. 2, the ground station 210 may include one or more processors 212, data storage 214, and program instructions 216. A processor 212 may be a general-purpose processor or a special purpose processor (e.g., digital signal processors, application specific integrated circuits, etc.). The one or more processors 212 can be configured to execute computer-readable program instructions 216 that are stored in a data storage 214 and are executable to provide at least part of the functionality described herein.

The data storage 214 may include or take the form of one or more computer-readable storage media that may be read or accessed by at least one processor 212. The one or more computer-readable storage media can include volatile and/or non-volatile storage components, such as optical, magnetic, organic or other memory or disc storage, which may be integrated in whole or in part with at least one of the one or more processors 212. In some embodiments, the data storage 214 may be implemented using a single physical device (e.g., one optical, magnetic, organic or other memory or disc storage unit), while in other embodiments, the data storage 214 can be implemented using two or more physical devices.

As noted, the data storage 214 may include computer-readable program instructions 216 and perhaps additional data, such as diagnostic data of the ground station 210. As such, the data storage 214 may include program instructions to perform or facilitate some or all of the functionality described herein.

In a further respect, the ground station 210 may include a communication system 218. The communication system 218 may include one or more wireless interfaces and/or one or more wireline interfaces, which allow the ground station 210 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network. The ground station 210 may communicate with the aerial vehicle 230, other ground stations, and/or other entities (e.g., a command center) via the communication system 218.

In an example embodiment, the ground station 210 may include communication systems 218 that allows for both short-range communication and long-range communication. For example, the ground station 210 may be configured for short-range communications using Bluetooth and for long-range communications under a CDMA protocol. In such an embodiment, the ground station 210 may be configured to function as a "hot spot"; or in other words, as a gateway or proxy between a remote support device (e.g., the tether 220, the aerial vehicle 230, and other ground stations) and one or more data networks, such as cellular network and/or the Internet. Configured as such, the ground station 210 may facilitate data communications that the remote support device would otherwise be unable to perform by itself.

For example, the ground station 210 may provide a WiFi connection to the remote device, and serve as a proxy or gateway to a cellular service provider's data network, which the ground station 210 might connect to under an LTE or a 3G protocol, for instance. The ground station 210 could also serve as a proxy or gateway to other ground stations or a command center, which the remote device might not be able to otherwise access.

Moreover, as shown in FIG. 2, the tether 220 may include transmission components 222 and a communication link 224. The transmission components 222 may be configured to transmit electrical energy from the aerial vehicle 230 to the ground station 210 and/or transmit electrical energy from the ground station 210 to the aerial vehicle 230. The transmission components 222 may take various different forms in various different embodiments. For example, the transmission components 222 may include one or more electrical conductors that are configured to transmit electricity. And in at least one such example, the one or more electrical conductors may include aluminum and/or any other material which allows for the conduction of electric current. Moreover, in some implementations, the transmission components 222 may surround a core of the tether 220 (not shown).

The ground station 210 could communicate with the aerial vehicle 230 via the communication link 224. The communication link 224 may be bidirectional and may include one or more wired and/or wireless interfaces. Also, there could be one or more routers, switches, and/or other devices or networks making up at least a part of the communication link 224.

Further, as shown in FIG. 2, the aerial vehicle 230 may include one or more sensors 232, a power system 234, power generation/conversion components 236, a communication system 238, one or more processors 242, data storage 244, program instructions 246, and a control system 248.

The sensors 232 could include various different sensors in various different embodiments. The sensors 232 may also include one or more probes coupled to strength members of the tether 220. In another example, the sensors 232 may further include a global positioning system (GPS) receiver. The GPS receiver may be configured to provide data that is typical of well-known GPS systems (which may be referred to as a global navigation satellite system (GNNS)), such as the GPS coordinates of the aerial vehicle 230. Such GPS data may be utilized by the AWT 200 to provide various functions described herein.

As another example, the sensors 232 may include one or more wind sensors, such as one or more pitot tubes. The one or more wind sensors may be configured to detect apparent and/or relative wind. Such wind data may be utilized by the AWT 200 to provide various functions described herein.

Still as another example, the sensors 232 may include an inertial measurement unit (IMU). The IMU may include both an accelerometer and a gyroscope, which may be used together to determine the orientation of the aerial vehicle 230. In particular, the accelerometer can measure the orientation of the aerial vehicle 230 with respect to earth, while the gyroscope measures the rate of rotation around an axis, such as a centerline of the aerial vehicle 230. IMUs are commercially available in low-cost, low-power packages. For instance, the IMU may take the form of or include a miniaturized MicroElectroMechanical System (MEMS) or a NanoElectroMechanical System (NEMS). Other types of IMUs may also be utilized. The IMU may include other sensors, in addition to accelerometers and gyroscopes, which may help to better determine position. Two examples of such sensors are magnetometers and pressure sensors. Other examples are also possible.

While an accelerometer and gyroscope may be effective at determining the orientation of the aerial vehicle 230, slight errors in measurement may compound over time and result in a more significant error. However, an example aerial vehicle 230 may be able to mitigate or reduce such errors by using a magnetometer to measure direction. One example of a magnetometer is a low-power, digital 3-axis magnetometer, which may be used to realize an orientation independent electronic compass for accurate heading information. However, other types of magnetometers may be utilized as well.

The aerial vehicle 230 may also include a pressure sensor or barometer, which can be used to determine the altitude of the aerial vehicle 230. Alternatively, other sensors, such as sonic altimeters or radar altimeters, can be used to provide an indication of altitude, which may help to improve the accuracy of and/or prevent drift of the IMU. In addition, the aerial vehicle 230 may include one or more load cells configured to detect forces distributed between a connection of the tether 220 to the aerial vehicle 230.

As noted, the aerial vehicle 230 may include the power system 234. The power system 234 could take various different forms in various different embodiments. For example, the power system 234 may include one or more batteries for providing power to the aerial vehicle 230. In some implementations, the one or more batteries may be rechargeable and each battery may be recharged via a wired connection between the battery and a power supply and/or via a wireless charging system, such as an inductive charging system that applies an external time-varying magnetic field to an internal battery and/or charging system that uses energy collected from one or more solar panels.

As another example, the power system 234 may include one or more motors or engines for providing power to the aerial vehicle 230. In some implementations, the one or more motors or engines may be powered by a fuel, such as a hydrocarbon-based fuel. And in such implementations, the fuel could be stored on the aerial vehicle 230 and delivered to the one or more motors or engines via one or more fluid conduits, such as piping. In some implementations, the power system 234 may be implemented in whole or in part on the ground station 210.

As noted, the aerial vehicle 230 may include the power generation/conversion components 236. The power generation/conversion components 236 could take various different forms in various different embodiments. For example, the power generation/conversion components 236 may include one or more generators, such as high-speed, direct-drive generators. With this arrangement, the one or more generators may be driven by one or more rotors. And in at least one such example, the one or more generators may operate at full rated power wind speeds of 11.5 meters per second at a capacity factor which may exceed 60 percent, and the one or more generators may generate electrical power from 40 kilowatts to 600 megawatts.

Moreover, as noted, the aerial vehicle 230 may include a communication system 238. The communication system 238 may take the form of or be similar in form to the communication system 218. The aerial vehicle 230 may communicate with the ground station 210, other aerial vehicles, and/or other entities (e.g., a command center) via the communication system 238.

In some implementations, the aerial vehicle 230 may be configured to function as a "hot spot"; or in other words, as a gateway or proxy between a remote support device (e.g., the ground station 210, the tether 220, other aerial vehicles) and one or more data networks, such as cellular network and/or the Internet. Configured as such, the aerial vehicle 230 may facilitate data communications that the remote support device would otherwise be unable to perform by itself.

For example, the aerial vehicle 230 may provide a WiFi connection to the remote device, and serve as a proxy or gateway to a cellular service provider's data network, which the aerial vehicle 230 might connect to under an LTE or a 3G protocol, for instance. The aerial vehicle 230 could also serve as a proxy or gateway to other aerial vehicles or a command station, which the remote device might not be able to otherwise access.

As noted, the aerial vehicle 230 may include the one or more processors 242, the program instructions 246, and the data storage 244. The one or more processors 242 can be configured to execute computer-readable program instructions 246 that are stored in the data storage 244 and are executable to provide at least part of the functionality described herein. The one or more processors 242 may take the form of or be similar in form to the one or more processors 212, the data storage 244 may take the form of or be similar in form to the data storage 214, and the program instructions 246 may take the form of or be similar in form to the program instructions 216.

Moreover, as noted, the aerial vehicle 230 may include the control system 248. In some implementations, the control system 248 may be configured to perform one or more functions described herein. The control system 248 may be implemented with mechanical systems and/or with hardware, firmware, and/or software. As one example, the control system 248 may take the form of program instructions stored on a non-transitory computer readable medium and a processor that executes the instructions. The control system 248 may be implemented in whole or in part on the aerial vehicle 230 and/or at least one entity remotely located from the aerial vehicle 230, such as the ground station 210. Generally, the manner in which the control system 248 is implemented may vary, depending upon the particular application.

While the aerial vehicle 230 has been described above, it should be understood that the methods and systems described herein could involve any suitable aerial vehicle that is connected to a tether, such as the tether 220 and/or the tether 120.

C. Illustrative Aerial Vehicle

Figure 3:
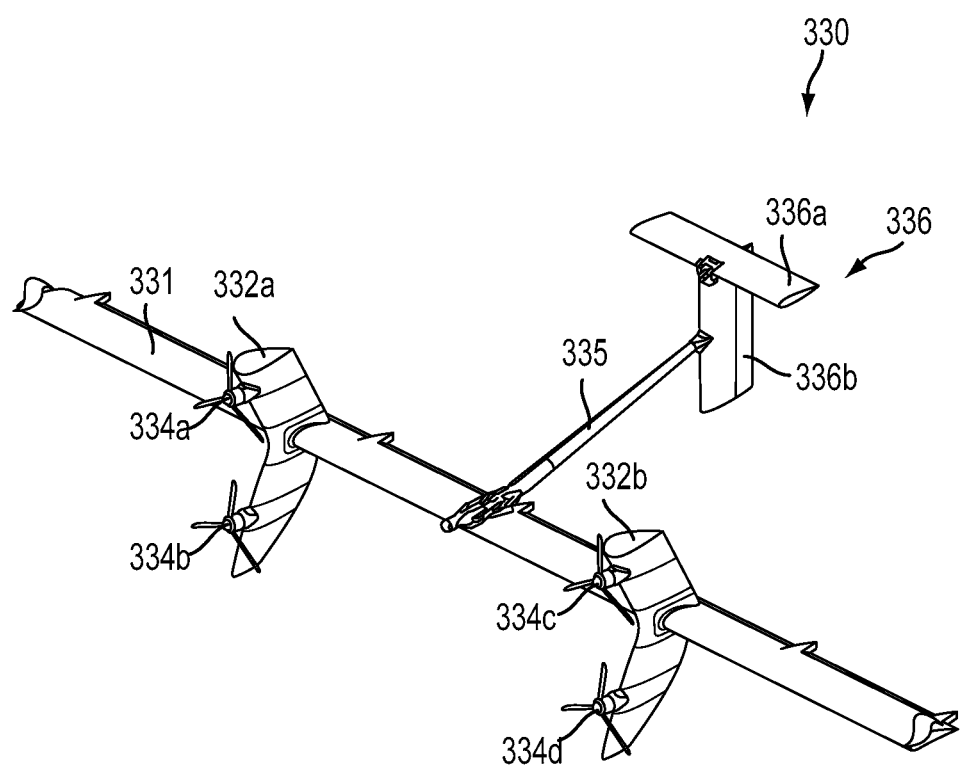
FIG. 3 depicts an aerial vehicle, according to an example embodiment.

FIG. 3 depicts an aerial vehicle 330, according to an example embodiment. The aerial vehicle 130 and/or the aerial vehicle 230 may take the form of or be similar in form to the aerial vehicle 330. In particular, the aerial vehicle 330 may include a main wing 331, pylons 332a, 332b, rotors 334a, 334b, 334c, 334d, a tail boom 335, and a tail wing assembly 336. Any of these components may be shaped in any form which allows for the use of components of lift to resist gravity and/or move the aerial vehicle 330 forward.

The main wing 331 may provide a primary lift force for the aerial vehicle 330. The main wing 331 may be one or more rigid or flexible airfoils, and may include various control surfaces, such as winglets, flaps (e.g., Fowler flaps, Hoerner flaps, split flaps, and the like), rudders, elevators, spoilers, dive brakes, etc. The control surfaces may be used to stabilize the aerial vehicle 330 and/or reduce drag on the aerial vehicle 330 during hover flight, forward flight, and/or crosswind flight.

The main wing 331 and pylons 332a, 332b may be any suitable material for the aerial vehicle 330 to engage in hover flight, forward flight, and/or crosswind flight. For example, the main wing 331 and pylons 332a, 332b may include carbon fiber and/or e-glass, and include internal supporting spars or other structures. Moreover, the main wing 331 and pylons 332a, 332b may have a variety of dimensions. For example, the main wing 331 may have one or more dimensions that correspond with a conventional wind turbine blade. As another example, the main wing 331 may have a span of 8 meters, an area of 4 meters squared, and an aspect ratio of 15.

The pylons 332a, 332b may connect the rotors 334a, 334b, 334c, and 334d to the main wing 331. In some examples, the pylons 332a, 332b may take the form of, or be similar in form to, a lifting body airfoil (e.g., a wing). In some examples, a vertical spacing between corresponding rotors (e.g., rotor 334a and rotor 334b on pylon 332a) may be 0.9 meters.

The rotors 334a, 334b, 334c, and 334d may be configured to drive one or more generators for the purpose of generating electrical energy. In this example, the rotors 334a, 334b, 334c, and 334d may each include one or more blades, such as three blades or four blades. The rotor blades may rotate via interactions with the wind and be used to drive the one or more generators. In addition, the rotors 334a, 334b, 334c, and 334d may also be configured to provide thrust to the aerial vehicle 330 during flight. With this arrangement, the rotors 334a, 334b, 334c, and 334d may function as one or more propulsion units, such as a propeller. Although the rotors 334a, 334b, 334c, and 334d are depicted as four rotors in this example, in other examples the aerial vehicle 330 may include any number of rotors, such as less than four rotors or more than four rotors (e.g., eight rotors).

A tail boom 335 may connect the main wing 331 to the tail wing assembly 336, which may include a tail wing 336a and a vertical stabilizer 336b. The tail boom 335 may have a variety of dimensions. For example, the tail boom 335 may have a length of 2 meters. Moreover, in some implementations, the tail boom 335 could take the form of a body and/or fuselage of the aerial vehicle 330. In such implementations, the tail boom 335 may carry a payload.

The tail wing 336a and/or the vertical stabilizer 336b may be used to stabilize the aerial vehicle 330 and/or reduce drag on the aerial vehicle 330 during hover flight, forward flight, and/or crosswind flight. For example, the tail wing 336a and/or the vertical stabilizer 336b may be used to maintain a pitch of the aerial vehicle 330 during hover flight, forward flight, and/or crosswind flight. The tail wing 336a and the vertical stabilizer 336b may have a variety of dimensions. For example, the tail wing 336a may have a length of 2 meters. Moreover, in some examples, the tail wing 336a may have a surface area of 0.45 meters squared. Further, in some examples, the tail wing 336a may be located 1 meter above a center of mass of the aerial vehicle 330.

While the aerial vehicle 330 has been described above, it should be understood that the systems described herein could involve any suitable aerial vehicle that is connected to an airborne wind turbine tether, such as the tether 120 and/or the tether 220.

D. Aerial Vehicle Coupled to a Ground Station Via a Tether

Figure 4:
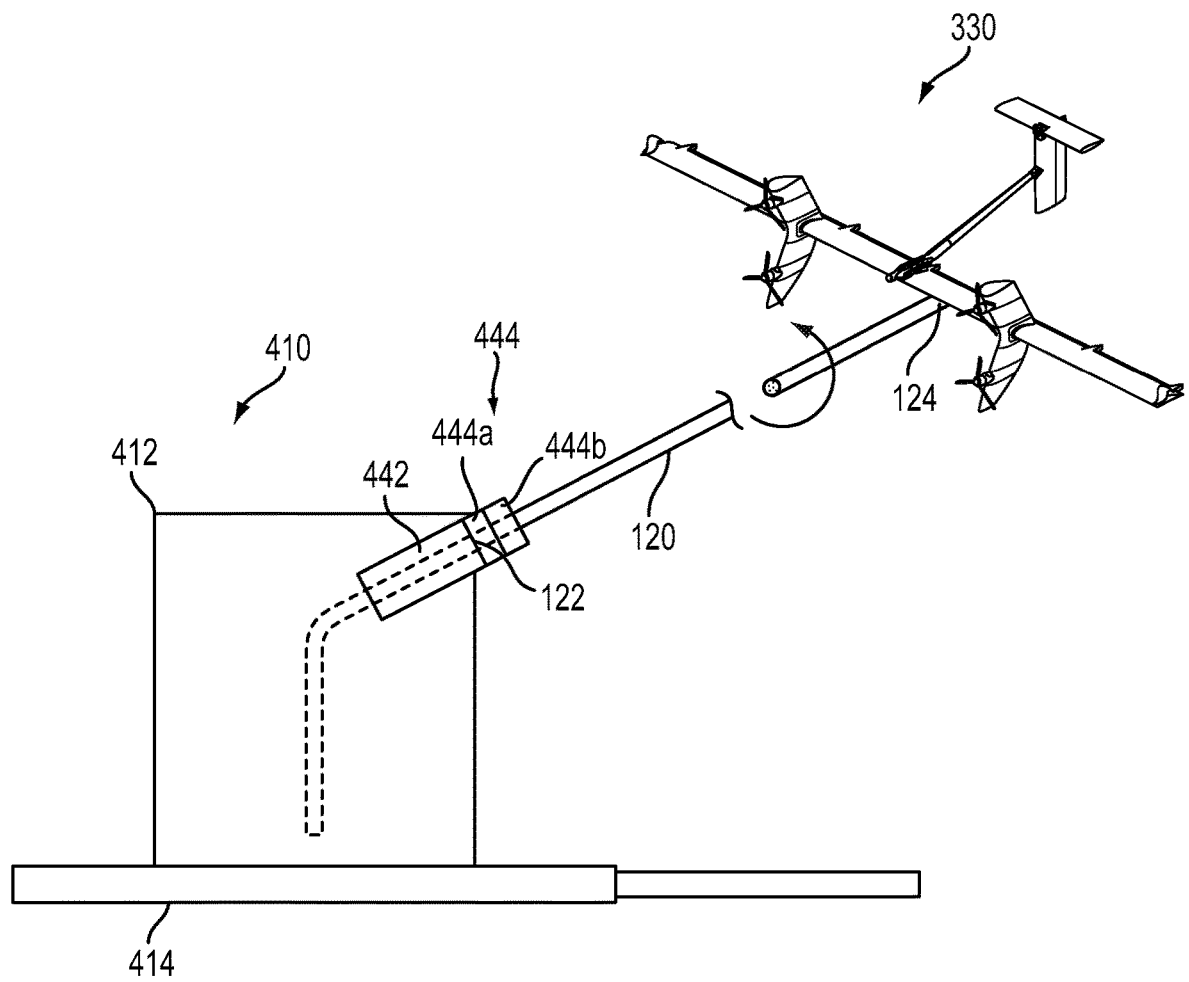
FIG. 4 depicts an aerial vehicle coupled to a ground station via a tether, according to an example embodiment.

FIG. 4 depicts the aerial vehicle 330 coupled to a ground station 410 via the tether 120, according to an example embodiment. Referring to FIG. 4, the ground station 410 may include a winch drum 412 and a platform 414. The ground station 110 and/or the ground station 210 may take the form of or be similar in form to the ground station 410. FIG. 4 is for illustrative purposes only and may not reflect all components or connections.

As shown in FIG. 4, the tether 120 may be coupled to a tether gimbal assembly 442 at a proximate tether end 122 and to the aerial vehicle 330 at a distal tether end 124. Additionally or alternatively, at least a portion of the tether 120 (e.g., at least one electrical conductor) may pass through the tether gimbal assembly 442. In some embodiments, the tether 120 may terminate at the tether gimbal assembly 442. Moreover, as shown in FIG. 4, the tether gimbal assembly 442 may also be coupled to the winch drum 412 which in turn may be coupled to the platform 414. In some embodiments, the tether gimbal assembly 442 may be configured to rotate about one or more axes, such as an altitude axis and an azimuth axis, in order to allow the proximate tether end 122 to move in those axes in response to movement of the aerial vehicle 330.

A rotational component 444 located between the tether 120 and the tether gimbal assembly 442 may allow the tether 120 to rotate about the long axis of the tether 120. The long axis is defined as extending between the proximate tether end 122 and the distal tether end 124. In some embodiments, at least a portion of the tether 120 may pass through the rotational component 444. Moreover, in some embodiments, the tether 120 may pass through the rotational component 444. Further, in some embodiments, the rotational component 444 may include a fixed portion 444a and a rotatable portion 444b, for example, in the form of one or more bearings and/or slip rings. The fixed portion 444a may be coupled to the tether gimbal assembly 442. The rotatable portion 444b may be coupled to the tether 120.

The use of the word fixed in the fixed portion 444a of the rotational component 444 is not intended to limit fixed portion 444a to a stationary configuration. In this example, the fixed portion 444a may move in axes described by the tether gimbal assembly 442 (e.g., altitude and azimuth), and may rotate about the ground station 410 as the winch drum 412 rotates, but the fixed portion 444a will not rotate about the tether 120, i.e., with respect to the long axis of the tether 120. Moreover, in this example, the rotatable portion 444b of the rotational component 444 may be coupled to the tether 120 and configured to substantially rotate with the rotation of tether 120.

Via the rotational component 444, the tether 120 may rotate about its centerline along the long axis as the aerial vehicle 330 orbits. The distal tether end 124 may rotate a different amount than the proximate tether end 122, resulting in an amount of twist along the length of the tether 420. With this arrangement, the amount of twist in the tether 420 may vary based on a number of parameters during crosswind flight of the aerial vehicle 330.

E. Illustrative Tethers

FIG. 5 depicts a tether 500, according to an example embodiment. The tether 120 and/or the tether 220 may take the form of or be similar in form to the tether 500. FIG. 5 and the remaining Figures depicting tethers are for illustrative purposes only and may not reflect all components or connections. Further, as illustrations the Figures may not reflect actual operating conditions, but are merely to illustrate embodiments described. For example, while a perfectly straight tether may be used to illustrate the described tether embodiments, during orbiting crosswind flight the tether may in practice exhibit some level of droop between the ground station and the aerial vehicle. Further still, the relative dimensions in the Figures may not be to scale, but are merely to illustrate the embodiments described.

As shown in FIG. 5, the tether 500 may include a core 510, a core jacket 520, a plurality of electrical conductors 530, and a jacket 540. The tether may have a long axis 502. For purposes of illustration only, the tether 500 in FIG. 5 is shown with a portion of some components removed (e.g., the jacket 540, the plurality of electrical conductors 530, the core jacket 520) to illustrate the arrangement of components in the tether 500. Accordingly, FIG. 5 may be referred to as a partial cutaway view of the tether 500.

The core 510 may be a solid core and may comprise an axial rod 512. As such, the tether 500 may be considered to have a single core design with the axial rod 512. The axial rod 512 may be considered a strength member of the tether core 510. In some embodiments, the axial rod 512 may provide a significant contribution to the tensile strength and/or shear strength of the tether 500. Beneficially, the axial rod 512 may improve resistance of the tether 500 to fatigue loads while an AWT (e.g., the AWT 100 and/or AWT 200) is in operation. Further, the axial rod 512 may improve resistance of various components of the tether 500 to fatigue loads, such as the plurality of electrical conductors 530.

The dimension of the axial rod 512 may be selected based at least in part on a weight of the tether 500, a predetermined loading of the tether, such as a predetermined fatigue loading of the tether 500, and/or an overall diameter of the tether 500. For use with AWTs, a preferred diameter of the axial rod 512 may be about 14 millimeters, with the overall tether 500 diameter around 27 millimeters. In other examines, a diameter of the axial rod 512 may be about 11 millimeters.

The axial rod 512 may take various different forms in various different embodiments. For example, in some embodiments, the axial rod 512 may comprise pultruded fiber rod, carbon fiber rod, a carbon fiber reinforced pultrusion (CFRP), one or more metals (e.g., aluminum), and/or a combination of carbon fiber and/or one or more metals. The axial rod 512 may include at least one conducting element such that electrical properties of the axial rod 512 may be measured. As one example, the axial rod 512 may comprise a combination of fibers, such as a first carbon fiber having a first modulus and second carbon fiber having a second modulus that is greater than the first modulus. As another example, the axial rod 512 may comprise carbon fiber and fiberglass. Further, the axial rod 512 may comprise a matrix composite and/or carbon fiber and/or fiberglass, such as a metal matrix composite (e.g., aluminum matrix composite). In one embodiment, the axial rod 512 may comprise a CFRP strength member that includes multiple one to five millimeter uniaxial carbon fiber strands set in a thermoset epoxy.

In some embodiments, the axial rod 512 may have a circular cross-section shape or may comprise other cross-section shapes. For example, in some embodiments, the axial rod 512 may have a rectangular cross-section shape, an oval cross-sectional shape, a trapezoidal cross-section shape, a pie-wedge cross-section shape, a triangular cross-section shape, etc. In addition, in some embodiments, the axial rod 512 may have a cross-section shape that varies along the long axis 502 of the tether.

Further, the plurality of electrical conductors 530 may be wound around an outer surface of the core jacket 520. The plurality of electrical conductors 530 may be configured to transmit electricity. For example, the plurality of electrical conductors 530 may be configured for high-voltage AC or DC power transmission (e.g., greater than 1,000 volts). For instance, the plurality of electrical conductors 530 may be configured to carry an AC or DC voltage of between 1 kilovolt and 5 kilovolts, or higher, and an associated power transmission current of between 50 amperes to 250 amperes.

In some embodiments, the plurality of electrical conductors 530 may be helically wound around the outer surface of the core jacket 520. Further, in some such embodiments, the plurality of electrical conductors 530 may be helically wound around the outer surface of the core jacket 520 with a helical angle between 15 to 45 degrees, such as 20 to 45 degrees, 35 to 40 degrees (e.g., 38.3 degrees), or 40 to 45 degrees (e.g., 42 degrees). In some such embodiments, the helical angle may be relative to the long axis 502 of the tether 500. The plurality of electrical conductors 530 may be wound around the outer surface 524 of the core jacket 520 in other ways.

Further, as shown in FIG. 5, the jacket 540 surrounds the plurality of electrical conductors 530. The jacket 540 may take various different forms in various different embodiments. For instance, the jacket 540 may include a thermoplastic polyurethane ("TPU"), polypropylene, hytrel, and/or nylon (e.g., nylon 11). In some embodiments, the jacket 540 may be extruded over the plurality of electrical conductors 530. Moreover, in some embodiments, when the tether 500 includes a fill material, the jacket 540 may be extruded over the fill material. Further, in some embodiments, the jacket 540 may have a preferred thickness of 1.2 or 1.5 millimeters. Other thicknesses are possible as well.

In some embodiments, one or more materials of the jacket 540 may be selected to increase the visibility of the tether 500 to humans and/or animals. For instance, in some embodiments, the jacket 540 may include materials that have a white or bright color, or a contrasting color pattern (e.g., a painted pattern). Further, in some embodiments, the jacket 540 may include a material or coating that reflects ultra-violet (UV) light, glows, or a combination of UV reflection and glowing.

In some examples, the tether 500 may further include at least one fiber optic cable and/or a coaxial conductor (not shown). The fiber optic cable or coaxial conductor may be configured for communication between an aerial vehicle (e.g., the aerial vehicle 330) and a ground station (e.g., the ground station 410). In some embodiments, the fiber optic cable or coaxial cable may be wound around the outer surface of the core jacket 520 in the same or similar way as the plurality of electrical conductors 530 are wound around the outer surface of the core jacket 520. In addition, in some embodiments, the fiber optic cable may be included in the axial rod 512. Moreover, in some embodiments, the fiber optic cable may be encased in a metallic tube, such as stainless steel. Further, in some embodiments, the fiber optic cable encased in the metallic tube may be included in the axial rod 512.

In some examples, at least one additional wire may be wound around the outer surface of the core jacket 520 in the same or similar way as the plurality of electrical conductors 530 are wound around the outer surface of the core jacket 520. The at least one additional wire may transmit a signal from one end of the tether 500 to another end of the tether 500. In other examples, the at least one additional wire may transmit a signal over just a portion of the tether 500. In further aspects, the at least one additional wire may be coupled to or be included as a part of a probe or gauge coupled to strength members of the tether core 510.

In some implementations, a tether may include a core comprising a plurality of core elements. FIG. 6 depicts a tether 600, according to an example embodiment. The tether 120 and/or the tether 220 may take the form of or be similar in form to the tether 600.

As shown in FIG. 6, the tether 600 may include a core 610, a plurality of electrical conductors 630 wound around the core 610, and a jacket 640. The tether 600 may include a long axis 602. Components in FIG. 6 similar to those in FIG. 5 may be of the same configuration and function in a similar manner. For example, the plurality of electrical conductors 630 may be the same as or similar to the plurality of electrical conductors 530 of FIG. 5 and a jacket 640 may be the same as or similar to the jacket 540 of FIG. 5. For purposes of illustration only, the tether 600 in FIG. 6 is shown with a portion of some components removed to illustrate the arrangement of components in the tether 600 in a similar way as the tether 500 in FIG. 5.

The core 610 may be a cabled core and may comprise a plurality of core elements 612. Within examples, the plurality of core elements 612 may be referred to as a plurality of strength members or a plurality of strands. The plurality of core elements 612 may provide a significant contribution to the tensile strength and/or shear strength of the tether 600 in a similar way as the axial rod 512, improve resistance of the tether 600 to fatigue loads while an AWT (e.g., the AWT 100 and/or AWT 200) is in operation in a similar way as the axial rod 512, and improve resistance of various components of the tether 600 to fatigue loads, such as the plurality of electrical conductors 630, in a similar way as the axial rod 512.

The plurality of core elements 612 may take various different forms in various different embodiments. The plurality of core elements 612 may include a number of rods arranged in layers. For example, as illustrated in FIG. 6, there may be three layers of rods. In at least one example, a first layer (near a middle of the tether 600) may include one rod, a second layer (radially outward from the first layer) may include six rods, and a third layer (radially outward from the second layer) may include twelve rods. As such, the plurality of core elements 612 may include nineteen rods. However, in other examples, the plurality of core elements 612 may include more or less than nineteen rods. In addition, in other examples, the plurality of core elements 612 may be arranged in more or less than three layers.

In some embodiments, the plurality of core elements 612 may comprise any of the materials that the axial rod 512 may comprise. For instance, in some embodiments, at least one core element of the plurality of core elements 612 may include carbon fiber. Moreover, in some embodiments, at least one core element of the plurality core elements 612 may have preferred dimension (e.g., diameter) of 3.5 millimeters. In addition, in some embodiments, the plurality of core elements 612 may comprise any cross-section shapes of the axial rod 512. For instance, in some embodiments, at least one core element of the plurality of core elements 612 may comprise a circular cross-section shape. For use with AWTs, the overall tether 600 diameter may be around 27 millimeters.

Further, in some embodiments, each core element of the plurality of core elements 612 may have the same material, same dimension, and/or same cross-section. However, in other embodiments, at least two core elements of the plurality of core elements 612 may have different materials, dimensions, and/or cross-section shapes. For instance, in some embodiments, at least one core element in the plurality of core elements 612 may take the form of or be similar in form to the axial rod 512 and other core elements in the plurality of core elements 612 may be wound around the at least one core element.

Yet further, in some embodiments, at least one core element of the plurality of core elements 612 may be helically wound around another core element of the plurality of core elements 612 in a similar way as the plurality of electrical conductors 530 are helically wound around the core 510. Moreover, in some embodiments, at least two core elements of the plurality of core elements 612 may be wound around another core element of the plurality of core elements 612 with a reverse oscillating lay.

Further, the number of core elements in the plurality of core elements 612 and/or arrangement of core elements in layers in the plurality of core elements 612 may be selected based at least in part on a weight of the tether 600 and/or a predetermined loading of the tether, such as a predetermined fatigue loading of the tether 600.

In some embodiments, the core 610 may further include a capping layer surrounding and/or binding the plurality of core elements 612 and may additionally separate the plurality of core elements 612 from the plurality of electrical conductors 630. In addition, the capping layer may reduce a contact pressure between at least one core element of the plurality of core elements 612 and at least one conductor of the plurality of electrical conductors 630. Furthermore, the capping layer may serve as an electrical insulator between the plurality of core elements 612. In some embodiments, the capping layer may have a thickness that is less than a thickness of the conductor jacket 520 of FIG. 5. Moreover, in some embodiments, the capping layer may have a hardness that is greater than a hardness of the compliant layer 520.

The plurality of electrical conductors 630 may have a similar arrangement and function in a similar manner as the plurality of electrical conductors 530. For instance, the plurality of electrical conductors 630 may be configured to transmit electricity in the same or similar way as the plurality of electrical conductors 530 of FIG. 5.

Moreover, as shown in FIG. 6, the jacket 640 may surround the plurality of electrical conductors 630. The jacket 640 may take the form of or be similar in form to the jacket 540 of FIG. 5.

III. Illustrative Tether Terminations

Figure 7:
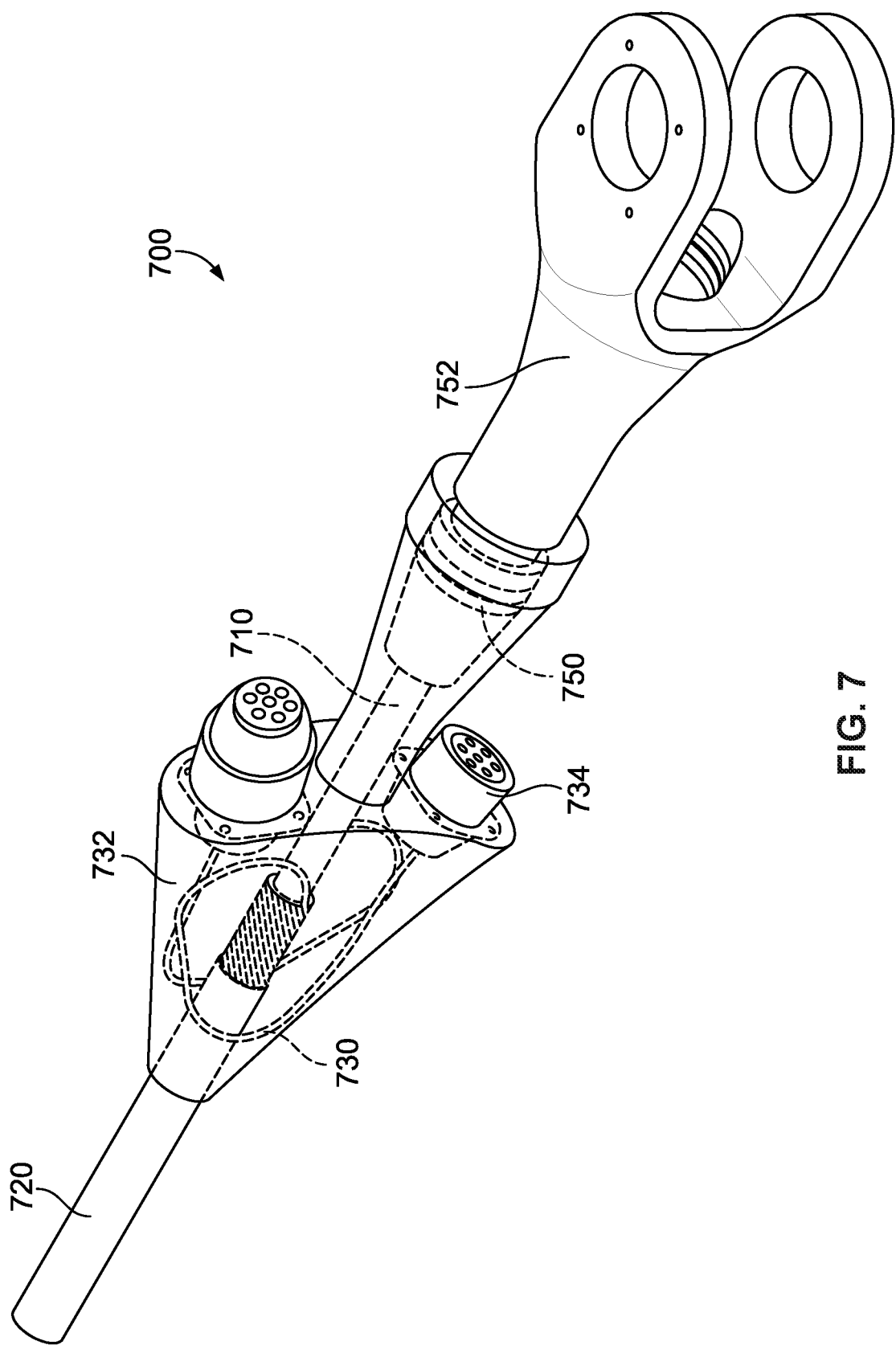
FIG. 7 depicts a tether termination, according to an example embodiment.

FIG. 7 depicts a tether termination assembly 700 among other components, according to an example embodiment. As shown in FIG. 7, the tether termination assembly 700 may include a tether 720, a conductor potting 732, and a tether termination 750. The tether 720 may include a tether core 710 and a plurality of conductors 730. The tether termination 750 may include a distal end 752 of the termination 750. The conductor potting 732 may include a plurality of conductor plugs 734 that couple to the plurality of conductors 730.

The tether 720 may have a similar arrangement and function in a similar manner as the tethers 120, 220, 500, and 600. The tether 720 may have a single core as the core 710 (similar in form to core 510 of FIG. 5) or a multi-core as the core 710 (similar in form to the core 610 of FIG. 6). Within the conductor potting 732, the plurality of electrical conductors 730 may be splayed out from the tether 720 to a plurality of conductor plugs 734. As such, the conductor plugs may provide a location for an external electrical connection to the electrical conductors 730 of the tether 720.

The tether core 710 may terminate within the tether termination 750. The tether termination 750 may generally be coned or tapered in shape such that the tether termination 750 has a smaller radius at a connection point with the tether core and a larger radius at the distal end 752 of the tether termination 750. The tether core 710 may be potted within the tether termination 750. Potting may include surrounding the tether core 710 with a non-conductive epoxy and curing the epoxy. The tether core 710 may also be splayed within the tether termination 750. Splaying the tether core 710 may include tapering or spreading out a plurality of strength members of the tether core 710 within the tether termination 750.

The distal end 752 of the tether termination 750 may mechanically connect to an aerial vehicle, for example by coupling to a bridle of the aerial vehicle (such as aerial vehicles 130, 230, or 330). The distal end 752 of the tether termination 750 may mechanically couple to a gimbal assembly installed on a ground station (such as gimbal assembly 442 of ground station 410).

IV. Illustrative Strength Member Damage

Figure 8:
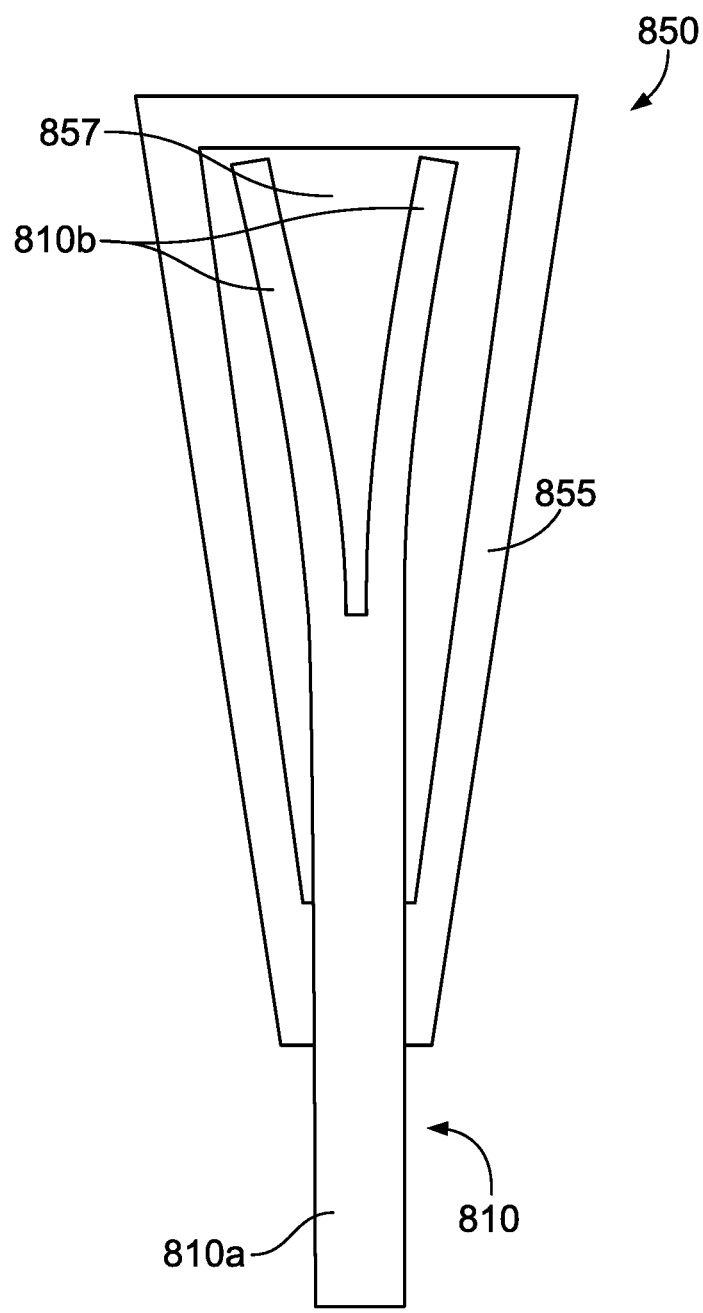
FIG. 8 depicts a tether termination, according to an example embodiment.

FIG. 8 depicts a tether termination 850, according to an example embodiment. The tether termination 850 may have a similar arrangement and function in a similar manner as the tether termination 750 of FIG. 7. The tether termination 850 may include a tether core 810, a tether termination structure 855, and a non-conductive epoxy 857. The tether termination 850 may have a conical shape such that a load applied to an attached tether may be distributed throughout the tether termination 850. By distributing the load throughout the tether termination 850, stress concentrations in the tether core 810 may be alleviated.

The tether termination 850 further allows for the tether to be connected to other AWT components. The tether core 810 enters as the tether termination 850 as a single core component 810a and is splayed about into multiple core components 810b in order to distribute forces applied on the tether. While FIG. 8 illustrates two core components 810b, more than two core components 810b are possible. For example, in at least one embodiment, the single core component 810a may be splayed about into eight multiple core components 810b. In other embodiments, the single core component 810a may be splayed in more or less than eight multiple core components 810b. In even other embodiments, the single core component 810a may continue throughout at least a portion of the tether termination 850 without being splayed.

Within the tether termination 850, the tether core 810 may be potted or surrounded by the non-conductive epoxy 857. The non-conductive epoxy 857 is fixedly coupled to the tether core 810 in order to prevent the tether core 810 from separating from the tether termination structure 855. The tether termination structure 855 may generally be coned shaped and provide external mechanical connections to the tether, such as to a tether bridle.

After repeated high load cycles where the termination 850 and the tether core 810 undergo various stresses, the core components 810b splayed throughout the epoxy 857 may begin to shear, shear, or otherwise begin to break or even suffer a complete failure. Moreover, as the tether termination 850 and tether core 810 are exposed to loading, the physical or mechanical properties of either the termination 850 or the core 810 may become reduced. Such damage may cause separation or weakness between the tether termination 850 and the tether core 810. As such, and as explained in further detail below, measuring an electrical property within the termination 850 may allow for the determination of potential damage, or increased potential of damage, within the tether termination 850.

FIG. 9 depicts an example of how the mechanical integrity of the tether core may deteriorate over time or become compromised. Specifically in FIG. 9, damage to a tether core may result in a change to an electrical property, particularly electrical resistance. Additionally, a tether core can become worn and damaged from use over time resulting in a change to an electrical property. Thus, monitoring for an electrical property outside of a predetermined range may provide indication of the state or amount of wear or damage within a tether core. FIG. 9 includes a multiple element strength member 902 and a damaged multiple element strength member 904. The multiple element strength member 902 and the damaged multiple element strength member 904 may take the form of or be similar in form to the core of the tether 120 of FIG. 1 and/or the tether core 510 of FIG. 6.

As described above, a strength member of a tether core may be electrically conductive, and as such an electrical property, such as an electrical resistance, may be measured over at least a portion of the strength member. Therefore, as depicted in FIG. 9, the multiple element strength member 902 may be modeled to have an equivalent resistance 902R. The equivalent resistance 902R illustrates how each of the strands of the multiple element strength member 902 has a resistance that can be measured.

Due to loading of a tether (e.g., regular tensile loading experienced by the tether during flight of an aerial vehicle), a strength member of the tether may become damaged. For example, strands of the multiple element strength member 902 may rub together resulting in fretting between strands as shown by a damaged area 904A of the damaged multiple element strength member 904. Because of the fretting of the damaged multiple element strength member 904 a corresponding change to the equivalent resistance 902R results in an equivalent resistance 904R. As depicted in FIG. 9, the equivalent resistance 904R now includes additional resistance 904B. Thus, an electrical resistance measured over the damaged multiple element strength member 904 may increase from an electrical resistance measured over the multiple element strength member 902. As such, a change in the electrical resistance may be indicative of damage to a tether, particularly in this example to the damaged multiple element strength member 904.

V. Illustrative Devices, Systems and Methods for Tether Core Monitoring

Figure 10:
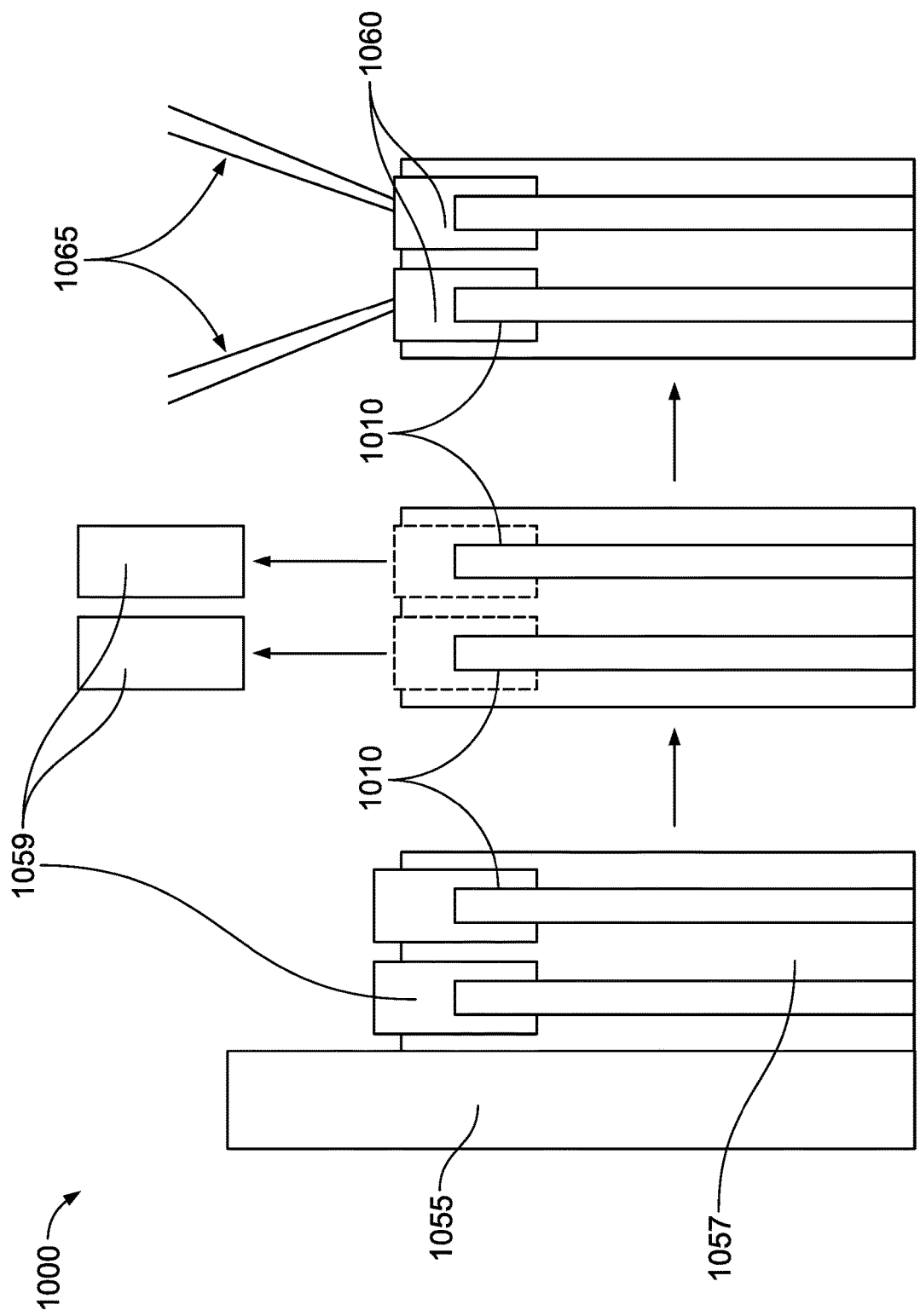
FIG. 10 depicts tether strength members with epoxy probe connections as part of a tether termination, according to an example embodiment.

FIG. 10 depicts a tether termination 1000, according to an example embodiment. FIG. 10 also illustrates an example method of attaching epoxy probes to tether core elements of the termination 1000. The tether termination 1000 includes a plurality of tether core elements 1010, a termination structure 1055, a non-conductive epoxy 1057, a plurality of masking plugs 1059, a plurality of conductive epoxy probes 1060, and electrical leads 1065. The tether termination 1000 may have a similar arrangement and function in a similar manner as the tether termination 750 of FIG. 7 or tether termination 850 of FIG. 8.

As shown in FIG. 10, an end of each of the plurality of tether core elements 1010 is covered by one of the plurality of masking plugs 1059. While the plurality of tether core elements 1010 are covered, the termination 1000 may be filled with the non-conductive epoxy 1057 and then cured. Then, each of the plurality of masking plugs 1059 may be removed and replaced with the plurality of conductive epoxy probes 1060. Each of the plurality of conductive epoxy probes 1060 may be in electrical connection with each corresponding tether core element 1010. The electrical leads 1065, which in at least some examples may be leads of a voltage gauge, a time-domain reflectometer or other electrical meter (not shown in FIG. 10), may then be installed in the conductive epoxy probes 1060. The termination 1000 may then be cured a second time.

Within some examples, the plurality of masking plugs 1059 may be comprised of a temporary masking putty. The temporary masking putty may be a high temperature, inert, flexible putty that may mask or cover the plurality of tether core elements 1010 but still allow access to the plurality of tether core elements 1010 after the non-conductive epoxy 1057 is cured.

Within yet other examples, the electrical leads 1065 may be installed without the use of the plurality of masking plugs 1059. For example, the tether termination 1000 may be completely filled with non-conductive epoxy 1057 and then cured. Then, the cured epoxy 1057 of the tether termination 1000 may be post-machined to uncover the plurality of tether core elements 1010. The tether core elements 1010 may be uncovered by machining processes such as grinding, milling, and or drilling. Then the plurality of conductive epoxy probes 1060 may be installed such that each of the plurality of conductive epoxy probes 1060 are in electrical connection with each corresponding tether core element 1010. Then the electrical leads 1065 may be installed and coupled to conductive epoxy probes 1060.

FIG. 11 depicts a tether termination 1100, according to an example embodiment. FIG. 11 also illustrates an example method of attaching mechanical probes to tether core elements of the termination 1100. The tether termination 1100 includes a plurality of tether core elements 1110, a termination structure 1155, a non-conductive epoxy 1157, a plurality of mechanical probes 1160, and electrical leads 1165. The tether termination 1100 may have a similar arrangement and function in a similar manner as the tether terminations 750, 850, or 1000 of FIGS. 7, 8 and 10 respectively.

As shown in FIG. 11, an end of each of the plurality of tether core elements 1110 may be left uncovered by the non-conductive epoxy 1157 that fills some or all of the termination structure 1155. Each of the plurality of tether core elements 1110 may then be fitted with one of the plurality of mechanical probes 1160. The plurality of mechanical probes 1160 may include a brass cap 1160a and a silver epoxy 1160b to couple each of the mechanical probes 1160 to each of the tether core elements 1110, as well as terminal leads to connect to the electrical leads 1165. In other examples, caps and connection means besides the brass cap 1160a and the silver epoxy 1160b may be used. Furthermore, each of the plurality of mechanical probes 1160 may be in electrical connection with each corresponding tether core element 1110. The electrical leads 1165, which in at least some examples may be leads of a voltage gauge, a time-domain reflectometer or other electrical meter (not shown in FIG. 11), may then be coupled to each of the plurality of mechanical probes 1160.

In other embodiments, electrical leads, such as the electrical leads 965 of FIG. 9 or the electrical leads 1165 of FIG. 11, may be soldered or brazed directly to tether core elements, such as the plurality of tether core elements 1110. Within examples, the electrical leads 1165 may be coupled to the plurality of core elements 1110 before filling the tether termination 1100 with epoxy 1157. In yet other embodiments, other mechanical grip methods may be used to couple the electrical leads 1165 to the mechanical probes 1160, directly to one or more of the plurality of tether core elements 1110, directly to a grounding sleeve, to a gauge terminal, or conductive wedge coupled to a section of tether core beyond the tether termination 1100.

FIG. 12 depicts a tether termination 1250, according to an example embodiment. FIG. 12 includes a tether core 1210, a plurality of splayed tether core elements 1210b, a tether termination structure 1255, one or more epoxy probes 1260, a plurality of electrical leads 1265a-d, a grounding sleeve 1262, a surface contact 1264, a first conduction path 1282, and a second conduction path 1284. The tether termination 1250 may have a similar arrangement and function in a similar manner as the tether terminations 750, 850, 1000, or 1100 of FIGS. 7, 8, 10 and 11 respectively. While two splayed tether core elements 1210b may be illustrated in FIG. 12, more than two splayed tether core elements 1210b may be possible.

Exemplified in FIG. 12 are potential electrical conduction paths that a voltage may be measured across in order to determine if there is any mechanical damage, to one or more of the splayed tether core elements 1210b. By measuring the voltage across one or more of the splayed tether core components 1210b, an electrical resistance (or other electrical property) may be determined and compared against a known resistance of undamaged splayed tether core components or a predetermined range of allowable electrical resistances. By comparing the determined electrical resistance with the known undamaged resistance, a determination may be made regarding an amount of damage of the splayed tether core components 1210b.

Furthermore, based on the determined electrical resistance, a change may be made to a value of an operational parameter of an aerial vehicle. An operational parameter may include flight parameter of an aerial vehicle such as an altitude, airspeed, loading, and/or directional heading of the aerial vehicle. Within some embodiments, the change may include landing the aerial vehicle and/or taking the tether out of service. In other examples, changing a value of an operational parameter of the aerial vehicle, such as reducing a load on the aerial vehicle, may lower a load on the tether core 1210.

In some embodiments, because electrical resistance varies with temperature, a temperature of the tether may be measured and the determined electrical resistance may be corrected for the temperature. In other embodiments, other physical states of the tether may be determined and the determined electrical resistance may be corrected based on the physical state.

In order to measure the voltage, a circuit may be created across at least some of each of the plurality of splayed tether core elements 1210b. The created circuit may be considered a conduction path. In order to establish a conduction path across at least a portion of one of the plurality of splayed tether core elements 1210b, the splayed tether core element 1210b may have a conductive probe coupled to an end of the tether core element 1210b (e.g., as shown in FIGS. 10 and 11). The conductive probe may include a mechanical conductive probe (as shown in FIG. 11) or one or more epoxy probes 1260 that may be similar in form to the epoxy probes 1060 of FIG. 10. The one or more epoxy probes 1260 may be installed through the termination structure 1255 and electrically couple to the end of at least one of the splayed tether core elements 1210b to one of the plurality of electrical leads 1265a or 1265c.

Thus, there may be different conduction paths across the tether core 1210 of the termination 1250. For example, the first conduction path 1282 may allow an electric current to run from the electrical leads 1265a through one of the epoxy probes 1260, along the splayed tether element 1210b, along at least a portion of the tether core 1210, to the grounding sleeve 1262, along a portion of the termination structure 1255, and ending at the electrical leads 1265b. Thus, the first conduction path 1282 may span the electrical leads 1265a to the electrical leads 1265b along the path illustrated in FIG. 12. The grounding sleeve 1262 may be coupled to the tether core 1210b at a nose or narrow end of the tether termination 1250 and may electrically ground the tether termination 1250. The nose of the tether termination may be located where the tether core 1210 enters the termination structure 1255. The electrical leads 1265b may be installed in an accessible location on the termination structure 1255.

In another example, the second conduction path 1284 may allow an electric current to run from the electrical leads 1265c through one of the epoxy probes 1260, along the splayed tether element 1210b, along at least a portion of the tether core 1210, to the surface contact 1264, and ending at the electrical leads 1265d. Thus, the second conduction path 1284 may span the electrical leads 1265c to the electrical leads 1265d along the path illustrated in FIG. 12. The surface contact 1264 may be a silver, nickel, or other metal ring coupled to the tether core 1210. The surface contact 1264 may be installed at a location along the tether core 1210 such that the health of the tether core 1210 from the end of at least one of the splayed tether components through a portion of the tether core 1210 may be determined. In other embodiments, there may be two or more surface contacts 1264 coupled to the tether core 1210 and a voltage between the two surface contacts 1264 may be measured.

In some aspects, with electrical leads 1265a-d across some portion of at least one of the splayed tether elements 1210b and/or a portion of the tether core 1210 a voltage may be measured. From the voltage a resistance between the electrical leads 1265a-d may be measured. If the resistance increases, for example, part of the splayed tether core element may have sheared, broken, or otherwise become damaged within the termination structure 1255. In another example, if the resistance decreases, there may be increased fretting between tether core elements within the tether core 1210. The fretting may be caused at least in part by friction between tether core elements that wears a non-conductive insulation between the individual tether core elements within the tether core 1210. Once the insulation is worn the individual tether core elements may come into electrical contact. As such, the circuit resistance may decrease and there may be a determination about the health of the tether core 1210.

As such, FIG. 12 illustrates various conductance paths for which a probe could be connected to measure an electrical property (e.g. a current, a current pulse, a voltage, a voltage pulse, or a resistance). Some examples conductance paths include any two of the following: (i) a splayed end of a strength member splayed within the first termination (e.g. using electrical leads 1265a or 1265c), (ii) a splayed end of the strength member splayed within a second termination (e.g. using electrical leads 1265a or 1265c), (iii) a splayed end of another strength member splayed within the first termination (e.g. using both sets of electrical leads 1265a and 1265c such that a path just within the termination is created), (iv) a surface contact coupled at a position along the tether, wherein the surface contact is in electrical connection with at least one of the plurality of strength members (e.g. leads 1265d coupled to surface contact 1264), or (v) a grounding connection (e.g. from leads 1265a through the grounding sleeve 1262 and to leads 1265b).

Figure 13:
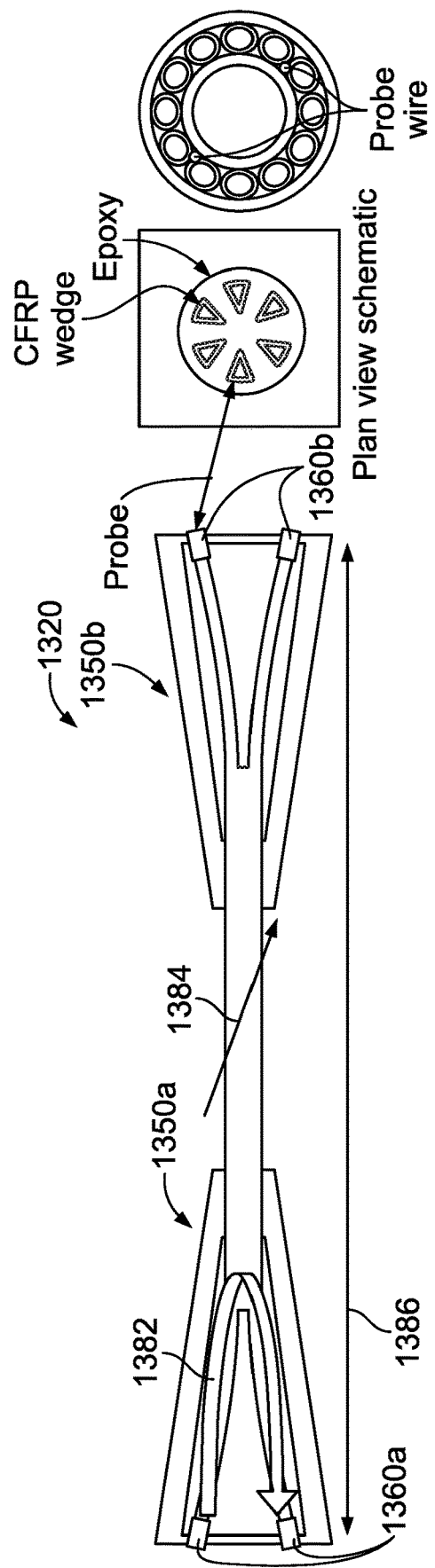
FIG. 13 depicts a tether with tether terminations, probes and electrical conduction paths, according to an example embodiment.

FIG. 13 depicts a tether 1320 with tether terminations 1350a-b. FIG. 13 further illustrates possible electrical conduction paths that may create one or more electrical circuits. A voltage may be measured over at least one electrical conduction path such that a circuit resistance may be determined. The circuit resistance may be determined and then used to determine if there is any damage to a tether core. FIG. 13 may include a first termination 1350a with one or more first probes 1360a, a second termination 1350b with one or more second probes 1360b, a splay leg-to-leg conduction path 1382, a splay leg-to-tether conduction path 1384, and an end-to-end conduction path 1386. While conduction paths 1382, 1384, and 1386 are illustrated in FIG. 13, other conduction paths may be possible. Further, the tether 1320 and tether terminations 1350a-b may have a similar arrangement and function in a similar manner as the tethers and terminations of FIGS. 5, 6, 7, 8, 9, 10 and 11 respectively. A desired conductive path may be dependent upon a type or location of damage a user or operator is concerned about.

Within examples, the splay leg-to-leg conduction path 1382 may be completely within the first termination 1350a in order to monitor one or more splayed tether core elements with the first termination 1350a. The splay leg-to-leg conduction path 1382 may span between two or more of the first probes 1360a installed in the first termination 1350a and coupled to ends of the tether core elements or "legs" splayed out within the first termination 1350a. The splay leg-to-leg conduction path 1382.

Within examples, the splay leg-to-tether conduction path 1384 may span one or more of the first probes 1360a to a location somewhere along the tether 1320. At the location a surface contact (such as the surface contact 1264 of FIG. 12) may be coupled to the tether 1320. Thus, the splay leg-to-tether conduction path 1384 may create an electrical circuit that includes the first termination 1350a and at least a portion of the tether 1320 such that the tether 1320 within first termination 1350a the portion of the tether 1320 in the circuit may be monitored for any damage.

Within examples, the end-to-end conduction path 1386 may span the first probes 1360a of the first termination 1350a to the second probes 1360b of the second termination 1360b. Thus, any damage in the first termination 1350a, the second termination 1350b, or along the tether 1320 may be sensed or determined.

A variety of conduction paths may be possible. For example, a tether core may be splayed out into eight strength members within a tether termination. As such, there may be a conduction path from a first splayed strength member through a second splayed strength member. Further, there may be a conduction path from the second splayed strength member through a third splayed strength member. Thus a strength member, like the second strength member may be part of one or more conduction paths.

Another conduction path may be between two or more gauge terminals coupled to the tether core. As such, a conduction path may include a portion of tether core not within a tether termination but just between the two or more gauge terminals.

Additionally, a method for monitoring damage within a tether core may include measuring an electrical resistance over a first conduction path, then measuring an electrical resistance over a second conduction path, and/or then measuring an electrical resistance over a third conduction path. The method may continue to measure an electrical resistance over a number of different conduction paths. As such, a change in electrical resistance within a specific conductive path may indicate damage within a portion of tether core that creates the specific conductive path. Therefore, the method for monitoring damage may indicate that there is damage within the portion of tether core and thus an approximate location of the damage may be determined.

As such, an electrical resistance may be measured from the first splayed strength member through the second splayed strength member. Further, another electrical resistance may be measures from the second splayed strength member to a third strength member. Another conduction path may include the first and the third splayed strength members.

Figure 14:
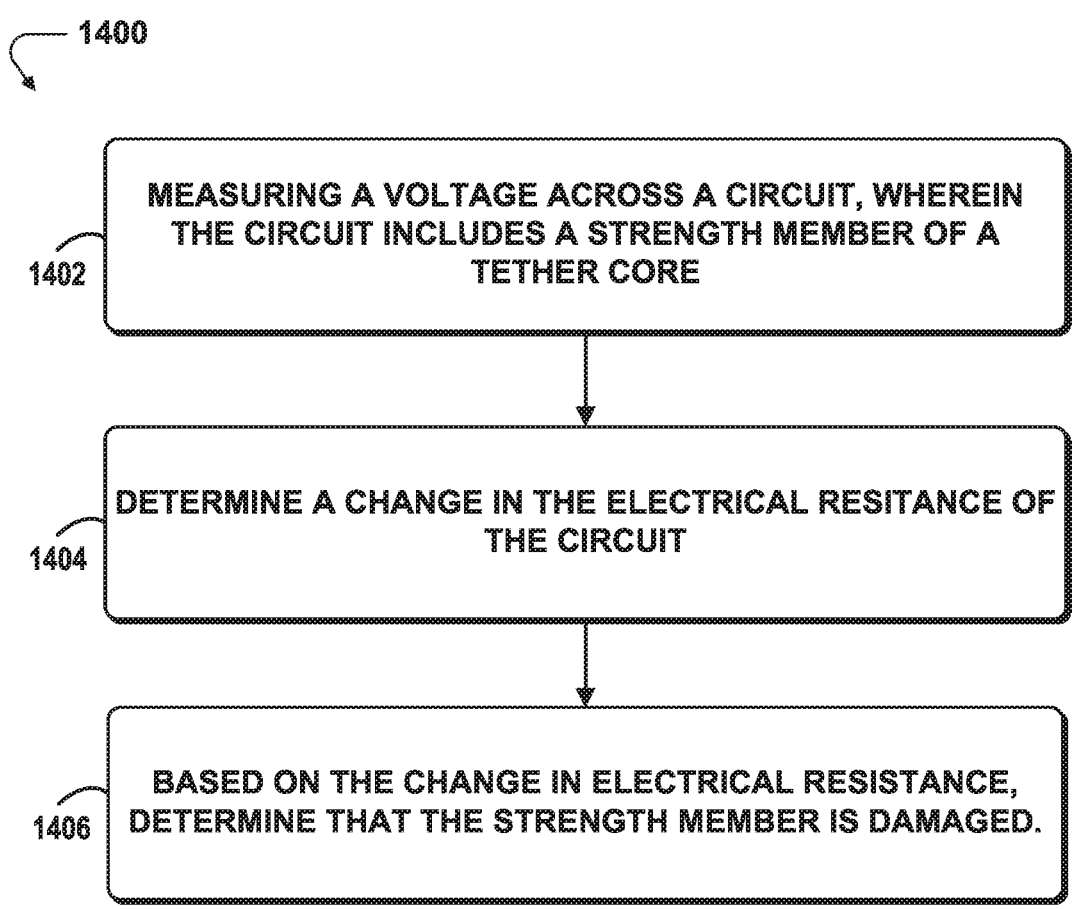
FIG. 14 is a simplified flowchart illustrating a method, according to an example embodiment.

FIG. 14 is a simplified block diagram illustrating a method 1400 for determining if a strength member is damaged, according to an example embodiment. In one example implementation, the method 1400 describes determining if an electrical property is outside a predetermined range or has changed such that a measured electrical property may indicate damage to the tether, or more particularly a strength core of the tether.

Illustrative methods, such as method 1400, may be carried out in whole or in part by a component(s) in a AWT system, such as one or more of the components in of the AWT 100 illustrated in FIG. 1, or by a component(s) of the AWT 200 as illustrated in FIG. 2. It should be understood that example methods, such as method 1400, might be carried out by entities, or combinations of entities (i.e., by other computing devices, and/or combinations thereof), without departing from the scope of the invention.

For example, functions of the method 1400 may be fully performed by a computing device (or components of a computing device such as one or more processors or controllers), or may be distributed across multiple components of the computing device, across multiple computing devices, and/or across a server. In at least one embodiment, functions of the method 1400 may be performed by control system 248 shown in FIG. 2. In some examples, the computing device may receive information from sensors of the computing device, or may receive information from other computing devices that collect the information. As with other examples, a computing device, a server, a ground station of an AWT, an aerial vehicle of an AWT, or an AWT system may perform the method 1400.

As shown by block 1402, the method 1400 includes coupling a probe to a strength member of a tether. Within examples, the probe may be configured to measure an electrical property of at least a portion of the strength member of the tether. Coupling the probe may include use a variety of connection means such as glue, epoxy, threading, or just touch contact.

As shown by 1404, the method 1400 includes measuring an electrical property along at least a portion of the strength member of the tether. Measuring the electrical property may occur at a predetermined measurement rate. The predetermined measurement rate may be determined based on an array of parameters including an operational event occurring, an operational age of the tether, and/or an operational mode of an AWT system (such as depicted in FIG. 1). Based on the operational event, the operational age and/or the operational mode, the electrical property may be measured at an adjusted measurement rate that is different than the predetermined measurement rate. The predetermined measurement rate (or adjusted measurement rate) may be at a high resolution or frequency (e.g., in the order of kilohertz), for instances that may affect flight determinations or controls. In other instances, the predetermined measurement rate may be at a low resolution or frequency (e.g., one hertz).

The operational event may include a weather event, launching and/or landing an aerial vehicle coupled to the tether, or an event that may cause the tension to be greater than a threshold tension. In some instances, rate of change of the tension to a level above the threshold tension may be a sudden or quick rate of change of the tension. The weather event may include high winds, a storm, and/or a lightning strike that may affect the operation of the AWT system. In at least one example, the operational event may include a malfunction that causes the tension to increase above the threshold tension. The malfunction may include a controller malfunction resulting in the tension of the tether to be greater than the threshold tension. In other instances, the operational event may include a zero-tension event. The zero-tension event may include an event where there is tether slack that may have consequences to the mechanical integrity of the tether. During the operational event, there may be a higher likelihood of damage to the tether (that may result in a change to a mechanical property of the tether) and the electrical property may be measured at an adjusted measurement rate that is greater than the predetermined measurement rate (i.e., a higher resolution). In some instances, the predetermined measurement rate may be increased to the adjusted measurement rate for a certain period of time or a period of cycles. Increasing the predetermined measurement rate may determine whether damaged occurred during the operational event.

Within examples, the portion of the strength member that the electrical property is measured along may include one of a plurality of portions of the strength member that the electrical property may be measured along. In some instances, an oblique or a diagonal portion of the strength member may be sensitive to a longitudinal crack propagation. As such, measuring the electrical property along the oblique portion may provide for a more accurate determination of a mechanical property or mechanical integrity of the strength member such as whether the tether is experiencing longitudinal crack propagation. In such an instance that the electrical property is measured along the oblique portion of the strength member, a first probe may be coupled to a core cross section and a second probe may be coupled to a surface of the core of the tether at some distance away. Thus, a conduction path may be formed between the first probe and the second probe such that the electrical signal travels through carbon fiber elements adjacent to one another.

In another aspect, if the first probe is coupled to the core cross section and the second probe is coupled to the core cross section some distance apart from the first probe, a conduction path between those probes may not be sensitive to longitudinal crack propagation. Thus, the portion of the strength member that the electrical property is measured may be based on a specific type of damage and/or mechanical property that is to be determined. Furthermore, among examples, if the first probe and the second probe are both coupled to a surface of the core, a conduction path between those probes may not be sensitive to damage within the core, but may be sensitive to surface damage phenomena.

In other examples, in a multiple element core strength member, such as described in FIG. 6, the portion of the strength member that the electrical property is measured may include a full length of at least two of a plurality of core elements. As such, the electrical property measured along the full length of one of the plurality of core elements may be compared to the electrical property measured along the full length of another of the plurality of core elements. If the measured electrical properties are different than one another, this may be indicative of damage to the multiple element core strength member. Other varying conduction paths based on one or more types of damage profiles or characteristics are considered by this application.

As shown by block 1406, the method 1400 includes determining that the measured electrical property is outside a predetermined range. In other examples, the method may include steps including determining a mechanical integrity or mechanical properties of the tether at least partially based on the measured electrical property. For example, if the electrical property is resistance, the method may include determining if the strength member of the tether core is damaged based on the change in electrical resistance. The determined electrical resistance may be compared to predetermined or expected values of electrical resistance based on the setup of the circuit and the strength member of the core. As such, within one example, if the electrical resistance increases it may be determined that at least a portion of the strength member has become damaged.

The predetermined range of threshold or allowable values may be considered a set of predetermined electrical properties. The set of predetermined electrical properties may include experimental data including an array of circumstances and variables and the expected results based on the variables selected. For example, the set of predetermined electrical properties may include a lookup table that provides a predetermined electrical property based on a temperature, a tension, and a length of the portion that the electrical property is measured over. As such, the one predetermined electrical property may provide an indication as to the change of the electrical property from one measurement to the next. Furthermore, the lookup table may include expected mechanical properties of a strength member based on the measured electrical property. In other examples, a lookup table may provide loading profiles and mean time to failure charts, among other possibilities, as inputs to the determination of the mechanical integrity of the strength member.

In some examples, the electrical property may be measured using a gauge, such as a voltmeter. The voltage may be measured by attaching the voltmeter to electrical leads that may be connected to different portions of a tether, such as probes coupled to the tether. The tether may be coupled to a ground station and an aerial vehicle. As such, within one example, the voltage may be measured while the aerial vehicle is in operation or in flight. In another embodiment, the voltage may be measured in a facility in order to assess for any damage before the tether is put into operation. In some examples, the facility may be a location where tethers are tested before being installed in an AWT. In yet other examples, the facility may be a location where tethers are tested before or after shipping. In other examples, field service technicians may perform the measurement as a part of scheduled maintenance.

Within examples, other gauges or meters may be coupled to probes installed in a tether termination in order to monitor or check for damage to a tether core. For example, a time-domain reflectometer (TDR) may be utilized in some aspects. A TDR may be coupled to probes installed within a tether termination. The probes coupled to the TDR may be the same as the probes 1060, 1160, 1260, and 1360*a-b* in FIGS. 10-13 respectfully. Further, the probes may be electrically coupled to tether core elements of a tether. As such, when the TDR is coupled to the probes, the TDR may send an electrical impulse or signal through the tether core element coupled to the probe. Then the TDR may analyze the magnitude, duration, and/or shape of the reflected signal.

Based on the magnitude, duration, and/or shape of the reflected signal, a determination may be made regarding whether the tether core element is damaged and if damaged, a degree of damage to the tether. Furthermore, a determination may also be made regarding the location of the damage based on the time that reflected signal takes to reach the TDR.

In further examples, the method 1400 may include determining a tension in a tether. The tether may be coupled to an aerial vehicle on a first end and a ground station on second end. As such, the tether may experience one or more forces while the aerial vehicle is in flight. In some aspects, the tension may be estimated and/or determined based on one or more existing related data sets and or flight simulations. For example, flight simulations that consider loading profiles and/or flight parameters (e.g., airspeed or altitude, among others), may accurately predict and/or determine the tension in the tether.

The method 1400 may also include determining a temperature of the tether. In some instances, the temperature may be determined based on an electrical amperage within one or more conductors wound around a core of the tether (e.g. the plurality of electrical conductors 530 or the plurality of electrical conductors 630 as described in FIGS. 5 and 6 respectively). Additionally, the temperature of the tether may vary based on weather conditions and/or forces experienced by the tether. Furthermore, a change in the temperature of the tether may result in a change in a measure electrical property of the tether. One or more sensors may be coupled to the tether, the ground station, and or the aerial vehicle and be configure to determine the tension and the temperature of the tether. In some aspects, the temperature may be estimated and/or determined based on one or more existing related data sets. For example, in some instances, based on an electrical load put on the tether, and ambient air conditions, the temperature of the tether may be predicted and/or determined.

Within some examples, the tension experienced by the tether and/or the temperature of the tether may be estimated based on a wind speed, environmental conditions (e.g., ambient temperature of the surrounding environment or other weather conditions), one or more flight conditions, flight simulations, and/or one or more flight parameters (e.g., airspeed or altitude of the aerial vehicle).

Determining a change to a mechanical property or the mechanical integrity of the strength member may be based on the tension, the temperature, and the measured electrical property. For example, the electrical property may include an electrical resistance. An increase in the electrical resistance may indicate whether there is damage to the tether that may compromise the mechanical integrity of the tether, particularly a strength member of the core of the tether. However, the electrical resistance may increase based on other aspects, including the tension of the tether and/or the temperature of the tether. For example, the electrical resistance may increase when the temperature of the tether increases. Similarly, the electrical resistance may increase when the tension of the tether increases. As such, the tension, the temperature and the electrical resistance may all be considered in determining the mechanical integrity of the strength member.

For example, changes in electrical resistance that occur at approximately 0.1 Hz frequencies may be correlated with changes in wind speed may indicate a change in a load and thus a tension in a tether. In another example, changes in electrical resistance that occur at a time scale relative to a thermal constant of the tether may indicate a change in temperature of the tether. Additionally, changes of electrical resistance that occur more gradually over longer periods of time, such as months or years, may indicate damage caused by fatigue. Finally, changes of electrical resistance that occur over short period of time or possibly even suddenly may indicate damage caused by creep compression failure and/or crack propagation within the tether. Furthermore, the rate of change of the tension and the rate of change of the temperature may also be considered in determining whether a portion of the tether is damaged. Therefore, within examples, after determining the tension, the temperature, and measuring the electrical property, the a change to a mechanical property (max stress/strain, fatigue life) or the mechanical integrity of the tether may be determined.

Moreover, based on the determination of the electrical property being outside a predetermined range, or a change to a mechanical property as described, an operational parameter of the aerial vehicle may be changed or adjusted. An operational parameter may include flight parameter of an aerial vehicle such as an altitude, airspeed, loading, and/or directional heading of the aerial vehicle. Within some embodiments, the change may include landing the aerial vehicle and/or taking the tether out of service. In other examples, changing a value of an operational parameter of the aerial vehicle, such as reducing a load on the aerial vehicle, may lower a load on the tether.

The operational age of the tether may be an age that the tether has been in use. In some instances, the operational age may be in time (e.g. measured in hours, months, years) or in a number of cycles. Within examples, the operational age may be relative to an expected lifespan or expected fatigue life of the tether. For example, the operational age may be within ten percent of an expected fatigue life. In another example, the operational age may include a break-in period. The break-in period may include a period of time or number of cycles right after the tether is put in operation. Based on the operational age, the electrical property may be measured at an adjusted measurement rate that may be different than the predetermined measurement rate. For example, to determine that a new tether is operating properly, the electrical property may be measured at the adjusted measurement rate that is greater than the predetermined measurement rate when the operational age of the tether is less than the break-in period. In some embodiments, the adjusted measurement rate may be less than the predetermined measurement rate.

Within some examples, the operational mode of the AWT system may include a take-off mode. The take-off mode may include launching the aerial vehicle coupled to the tether as well as paying out the tether. The operational mode may also include a landing mode. The landing mode may include reeling in the tether and landing the aerial vehicle. Based on the operational mode, the electrical property may be measured at an adjusted measurement rate that is different than the predetermined measurement which may allow a control system to better determine a mechanical integrity, for example if a mechanical property of the tether has changed. Different operational modes may result in unique or different loading of the tether and therefore measuring the electrical property more frequently during such operational modes may prevent additional damage by limiting forces experienced by the tether. For example, while paying out the aerial vehicle during the take-off mode, the predetermined measurement rate may increase to the adjusted measurement rate to measure an electrical property of the tether more frequently. Limiting damage to the tether may preserve the mechanical integrity of the tether.

In some instances, determinations as described herein may be carried out based on machine learning, statistical analysis, and/or other analysis techniques that incorporate numerous data points (e.g., hundreds to hundreds of thousands of data points). For example, determining whether a change in resistance is due to damage and/or how much of the change in resistance is attributable to temperature and/or tension (or loading) may be conducted utilizing a large data array. The data array could include information regarding predetermined expected results based on previously collected data including temperatures, tensions, flight parameters, and/or varying flight conditions. In other examples, determining the mechanical integrity of the tether may be based on a large data set of inputs that may include average lifespans, average tensile strength, and/or average fatigue life, all of which may be based on example flight scenarios or simulations. Other data sets that may provide insight and provide input to the determinations described herein are considered in this application.

Figure 15:
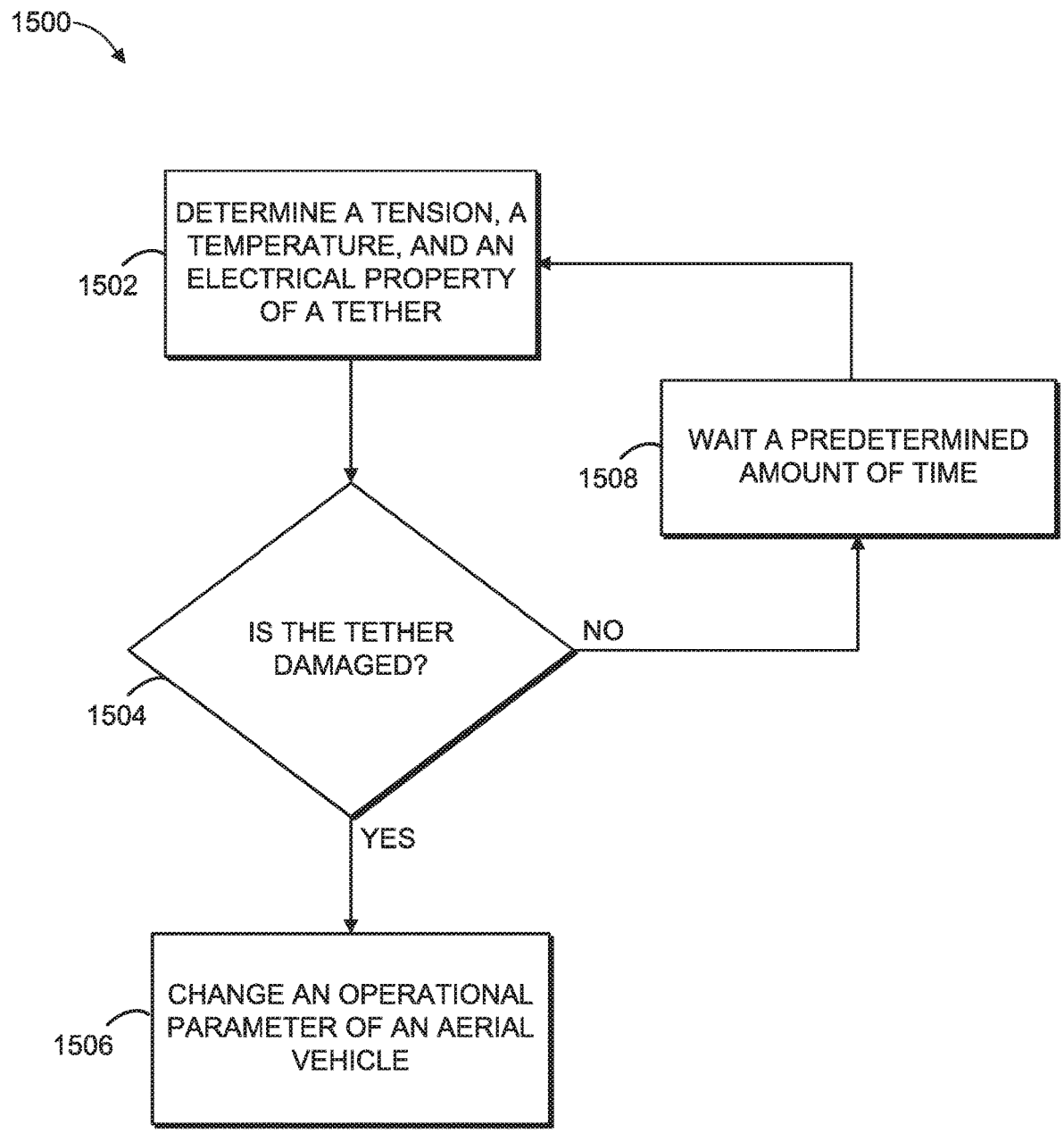
FIG. 15 is a simplified logic flowchart, according to an example embodiment.

FIG. 15 depicts a logic flowchart 1500 for how a control system of an AWT may implement determining a mechanical integrity of a strength member of a tether. As shown by block 1502, the control system may be configured to determine a tension, a temperature and an electrical property of a tether. As illustrated in FIG. 15, the decision question that may determine the mechanical integrity within this embodiment is if the tether is damaged at block 1504. If the control system determines that the tether is damaged, the control system may be configured to change an operational parameter of an aerial vehicle of the AWT. If the control system determines that the tether is not damaged, the control system may be configured to wait a predetermined amount of time as illustrated in block 1508. The predetermined amount of time may be based on a predetermined measurement rate. Furthermore, the predetermined measurement rate may be based on an operational event, an operational age of the tether, and/or an operational mode of the AWT.

VI. Illustrative Relationship Between Resistance and a Force on a Tether

Within examples, a change in resistance may be compared to a tension within a tether core. Further, the change in resistance and/or the tension may be plotted versus time during fatigue cycles. A large sudden change in resistance or a gradual change over time beyond a certain predetermined threshold may indicate damage to the tether core. As such, monitoring the resistance may provide for a determination that a tether has become damaged or that a tether may become damaged within a certain number of fatigue cycles. The tether may then be repaired or taken out of service as needed.

Figure 16:
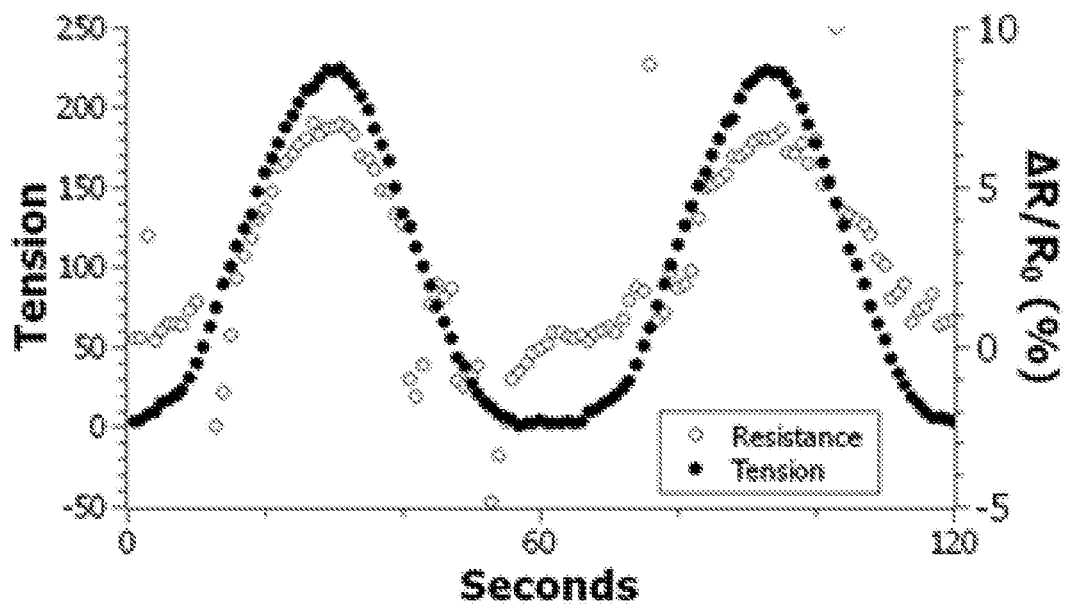
FIG. 16 depicts a relationship between tension and resistance over a time, according to an example embodiment.

FIG. 16 is an illustration of a change in resistance between two surface contacts coupled to a tether core during fatigue cycles. Both surface contacts may be between tether terminations. A tension applied to the tether is also plotted such that FIG. 16 depicts an example relationship between a change in resistance of the tether core and the tension over time of multiple fatigue cycles between the two surface contacts coupled to the tether core.

Figure 17:
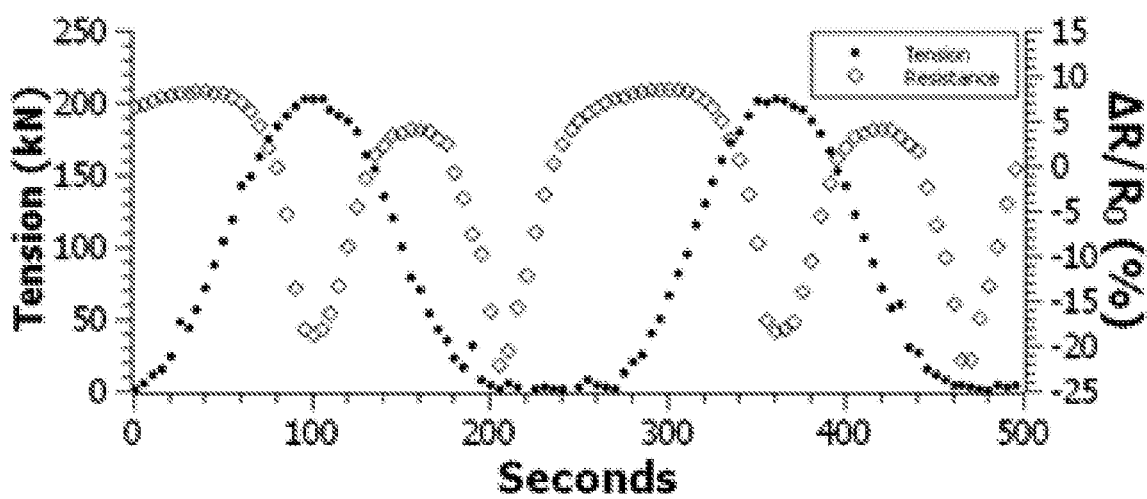
FIG. 17 depicts a relationship between tension and resistance over a time, according to an example embodiment.

FIG. 17 is similar to FIG. 16, however in FIG. 17 a change in resistance is determined between two adjacent strength members that are splayed within a tether termination. As such, FIG. 17 depicts an example relationship between a change in resistance of the two strength members and the tension over time of multiple fatigue cycles between the two strength members potted within the tether termination.

Figure 18:
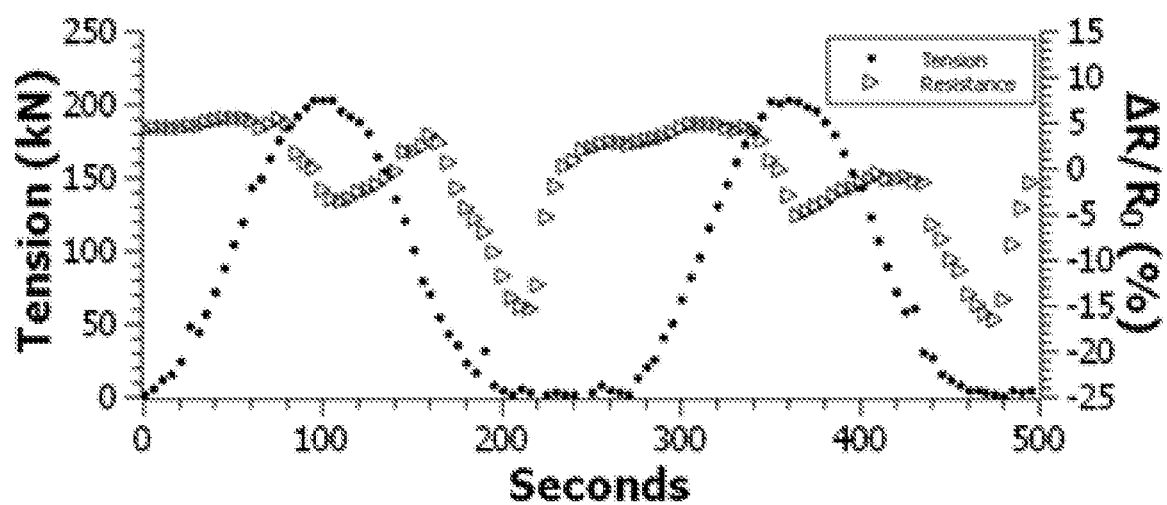
FIG. 18 depicts a relationship between tension and resistance over a time, according to an example embodiment.

FIG. 18 is similar to both FIG. 16 and FIG. 17, however in FIG. 18 a change in resistance is determined from a strength member splayed in a tether termination out to a surface contact on the tether core. As such, FIG. 18 depicts an example relationship between a change in resistance of the strength member within the termination out to the surface contact and the tension over time of multiple fatigue cycles between the two strength members potted within the tether termination.

VII. CONCLUSION

It should be understood that arrangements described herein are for purposes of example only. As such, those skilled in the art will appreciate that other arrangements and other elements (e.g. machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

We claim:

1. A system, comprising:
    a ground station;
    an aerial vehicle;
    a tether coupled to the ground station at a first end and to the aerial vehicle at a second end, wherein the tether comprises:
        a core having a strength member; and
        an electrical conductor wound around the core;
    a probe coupled to the strength member of the tether, wherein the probe measures an electrical property of at least a portion of the strength member;
    a control system configured to:
        at a predetermined measurement rate, measure the electrical property along the portion of the strength member of the tether;
        determine that the electrical property is outside a predetermined range;
        determine a tension in the tether;
        determine a temperature of the tether; and
        based on at least one of (i) the tension, (ii) the temperature, or (iii) the electrical property being outside the predetermined range, determine that the strength member of the tether is damaged.

2. The system of claim 1, wherein the control system is further configured to:
    based on the electrical property being outside the predetermined range, determine that a mechanical property of the strength member has changed.

3. The system of claim 1, wherein the control system is further configured to:
    in response to the determination that the electrical property is outside the predetermined range, adjust an operational parameter of the aerial vehicle.

4. The system of claim 3, wherein the operational parameter is at least one of: the tension of the tether, a velocity of the aerial vehicle, or an altitude of the aerial vehicle.

5. The system of claim 1, wherein the control system is further configured to:
determine that an operational event has occurred;
in response to the determination that the operational event has occurred, measure the electrical property at an adjusted measurement rate, wherein the adjusted measurement rate is different than the predetermined measurement rate.

6. The system of claim 5, wherein the operational event comprises a tension of the tether being greater than a threshold tension.

7. The system of claim 1, wherein the control system is further configured to:
determine an operational age of the tether; and
based on the operational age of the tether, measure the electrical property at an adjusted measurement rate that is different than the predetermined measurement rate.

8. The system of claim 7, wherein the control system is further configured to:
when the operational age of the tether is less than a break-in period, measure the electrical property at an adjusted measurement rate that is greater than the predetermined measurement rate.

9. The system of claim 7, wherein the operational age of the tether is within ten percent of an expected fatigue life of the tether.

10. The system of claim 1, further comprising:
a tether termination, wherein a second portion of the strength member of the tether is splayed out within the tether termination, wherein the portion of the strength member that the electrical property is measured comprises the second portion of the strength member within tether termination.

11. The system of claim 1, further comprising:
a first termination at the first end of the tether, wherein the first termination comprises a first end of the strength member;
a second termination at the second end of the tether, wherein the second termination comprises a second end of the strength member; and
wherein the probe is coupled to the first end of the strength member and the second end of the strength member.

12. The system of claim 1, wherein the electrical property of the strength member is at least one of: a current, a current pulse, a voltage, a voltage pulse, or a resistance.

13. A method, comprising:
coupling a probe to a strength member of a tether, wherein the probe is configured to measure an electrical property of a portion of the strength member;
measuring, at a predetermined measurement rate, the electrical property of the portion of the strength member;
determining that the electrical property is outside a predetermined range;
determining a tension in the tether;
determining a temperature of the tether;
based on at least one of (i) the tension, (ii) the temperature, or (iii) the determination that the electrical property is outside the predetermined range, determine that the strength member of the tether is damaged.

14. The method of claim 13, further comprising:
determining, based on the determination that electrical property is outside the predetermined range, that at least one of a tensile strength or a fatigue life of the tether has changed.

15. The method of claim 13, further comprising:
adjusting an operational parameter of an aerial vehicle coupled to the tether in response to the determination that the electrical property is outside the predetermined range.

16. The method of claim 13, further comprising:
determining an operational age of the tether; and
measuring the electrical property at an adjusted measurement rate, wherein the adjusted measurement rate is based on the operational age of the tether.

17. A system, comprising:
a tether that comprises:
a plurality of strength members;
a first tether termination at a first end of the tether; and
a second tether termination at a second end of the tether, wherein the plurality of strength members is splayed out within each the first tether termination and the second tether termination; and
a probe configured to measure an electrical property of at least one of the plurality of strength members, wherein the probe is coupled to at least two of (i) a splayed end of a strength member splayed within the first termination, (ii) a splayed end of the strength member splayed within the second termination, (iii) a splayed end of another strength member splayed within the first termination, (iv) a surface contact coupled at a position along the tether, wherein the surface contact is in electrical connection with at least one of the plurality of strength members, or (v) a grounding connection.

18. The system of claim 17, further comprising:
a control system configure to measure the electrical property of the at least one of the plurality of strength members of the tether at a predetermined measurement rate.

19. The system of claim 17, further comprising:
a second probe configured to determine a tension in the tether.

20. The system of claim 17, further comprising: a control system configure to:
measure the electrical property of the at least one of the plurality of strength members of the tether at a predetermined measurement rate; determine a tension in the tether; and
based on at least one of (i) the electrical property measured or (ii) the tension determined, determine that the at least one of the plurality of strength members of the tether is damaged.

* * * * *